(12) United States Patent
Ori

(10) Patent No.: US 11,079,573 B2
(45) Date of Patent: Aug. 3, 2021

(54) REAR CONVERTER LENS AND IMAGING APPARATUS

(71) Applicant: FUJIFILM Corporation, Tokyo (JP)

(72) Inventor: Tetsuya Ori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 119 days.

(21) Appl. No.: 16/453,653

(22) Filed: Jun. 26, 2019

(65) Prior Publication Data

US 2020/0018936 A1 Jan. 16, 2020

(30) Foreign Application Priority Data

Jul. 13, 2018 (JP) .............................. JP2018-133425

(51) Int. Cl.
| | |
|---|---|
| *G02B 9/12* | (2006.01) |
| *G02B 13/16* | (2006.01) |
| *G02B 13/18* | (2006.01) |
| *G02B 9/64* | (2006.01) |
| *G02B 9/22* | (2006.01) |
| *G02B 9/30* | (2006.01) |

(Continued)

(52) U.S. Cl.
CPC .............. *G02B 13/16* (2013.01); *G02B 9/64* (2013.01); *G02B 13/18* (2013.01); *G02B 9/12* (2013.01); *G02B 9/14* (2013.01); *G02B 9/22* (2013.01); *G02B 9/30* (2013.01); *G02B 13/006* (2013.01); *G02B 13/02* (2013.01)

(58) Field of Classification Search
CPC ... G02B 9/12; G02B 9/14; G02B 9/22; G02B 9/24; G02B 13/006; G02B 9/30; G02B 13/02; G02B 13/18; G02B 13/16; G02B 9/64

USPC ....... 359/672, 675, 716, 748, 784, 785–788, 359/809, 822, 823, 827
See application file for complete search history.

(56) References Cited

U.S. PATENT DOCUMENTS

| | | |
|---|---|---|
| 2017/0090163 A1 | 3/2017 | Ori |
| 2018/0095255 A1* | 4/2018 | Iwamoto .............. G02B 15/163 |
| 2018/0136439 A1 | 5/2018 | Ogata |

FOREIGN PATENT DOCUMENTS

| | | |
|---|---|---|
| JP | 2002-267929 A | 9/2002 |
| JP | 2004-226648 A | 8/2004 |

(Continued)

OTHER PUBLICATIONS

An Office Action; "Notice of Reasons for Refusal", mailed by the Japanese Patent Office dated Apr. 27, 2021, which corresponds to Japanese Patent Application No. 2018-133425 and is related to U.S. Appl. No. 16/453,653; with English language translation.

*Primary Examiner* — Evelyn A Lester

(74) *Attorney, Agent, or Firm* — Studebaker & Brackett PC

(57) ABSTRACT

A rear converter lens consists of, in order from the object side, a positive first lens group, a negative second lens group, and a positive third lens group. The first lens group consists of a cemented lens in which a negative lens concave toward the image side and a positive lens convex toward the object side are cemented, the second lens group consists of a cemented lens in which a negative lens concave toward the image side, a positive lens convex toward both sides, and a negative lens concave toward the object side are cemented, and the third lens group consists of, in order from the object side, a third lens group-first lens that is a positive lens convex toward the object side and a third lens group-second lens that is a negative lens.

8 Claims, 14 Drawing Sheets

(51) Int. Cl.
  *G02B 9/14* (2006.01)
  *G02B 13/00* (2006.01)
  *G02B 13/02* (2006.01)

(56) References Cited

FOREIGN PATENT DOCUMENTS

| | | |
|---|---|---|
| JP | 2011-002563 A | 1/2011 |
| JP | 2016-177042 A | 10/2016 |
| JP | 2017-062317 A | 3/2017 |
| JP | 2018-054991 A | 4/2018 |

\* cited by examiner

EXAMPLE 1

EXAMPLE 2

EXAMPLE 3

EXAMPLE 4

EXAMPLE 5

REAR CONVERTER LENS AND IMAGING APPARATUS

CROSS-REFERENCE TO RELATED APPLICATIONS

The present application claims priority under 35 U.S.C. § 119 to Japanese Patent Application No. 2018-133425, filed on Jul. 13, 2018. The above application is hereby expressly incorporated by reference, in its entirety, into the present application.

BACKGROUND OF THE INVENTION

1. Technical Invention

The present disclosure relates to a rear converter lens and an imaging apparatus comprising the rear converter lens.

2. Related Art

There is known a rear converter lens (rear conversion lens) which is attachably and detachably mounted on a master lens (main lens). The rear converter lens has a negative refractive power, and by being mounted on the master lens, a focal length of the whole system including the master lens is made larger than a focal length of the master lens alone. The rear converter lens is disposed between the master lens and the camera body. For example, JP2017-062317A, JP2016-177042A, JP2002-267929A, and JP2004-226648A each disclose an optical system in which a three-group rear converter lens, which consists of a first lens group having a positive refractive power, a second lens group having a negative refractive power, and a third lens group having a positive refractive power, is mounted on the master lens.

SUMMARY

In recent years, an imaging element mounted on a digital camera has been significantly advanced in its performance. With the advancement in performance of the imaging element, optical performance of the master lens has also been improved. Therefore, good optical performance is also required for the rear converter lens mounted on the master lens. Specifically, even in a case where the rear converter lens is mounted on the master lens, in contrast to the case of the master lens alone, optical performance is required that causes less change in various aberrations.

In general, in a case where the F number is reduced, the optical system is likely to exhibit aberrations. Therefore, particularly, there is a demand for a rear converter lens in which aberrations, such as spherical aberration, field curvature, and lateral chromatic aberration, are suppressed even in a case where the F number is reduced.

The rear converter lenses disclosed in JP2017-062317A, JP2016-177042A, JP2002-267929A, and JP2004-226648A do not have sufficient optical performance to be compatible with an optical system with a low F number, and thus the optical performance needs to be further improved.

An object of the present disclosure is to provide a rear converter lens having good optical performance that is compatible with an optical system with a low F number, and an imaging apparatus comprising the rear converter lens.

Specific means to achieve the above-mentioned object includes the following aspects.

A rear converter lens according to the present disclosure has a negative refractive power and being mounted on an image side of a master lens to thereby make a focal length of a whole system including the master lens larger than a focal length of the master lens alone. The rear converter lens consists of, in order from an object side, a first lens group having a positive refractive power, a second lens group having a negative refractive power, and a third lens group having a positive refractive power. The first lens group consists of a cemented lens in which, in order from the object side, a negative lens concave toward the image side and a positive lens convex toward the object side are cemented, the second lens group consists of a cemented lens in which, in order from the object side, a negative lens concave toward the image side, a positive lens convex toward both sides, and a negative lens concave toward the object side are cemented, the third lens group consists of, in order from the object side, a third lens group-first lens that is a positive lens convex toward the object side and a third lens group-second lens that is a negative lens, and assuming that a focal length of the first lens group is f1, a focal length of the second lens group is f2, a focal length of the third lens group is f3, a focal length of the whole rear converter lens is fC, an Abbe number of the negative lens of the first lens group is ν1, and an Abbe number of the positive lens of the first lens group is ν2, Conditional Expressions (1), (2), (3) and (4) are satisfied.

$$1.4 < f1/fC < -0.8 \tag{1}$$

$$0.2 < f2/fC < 0.5 \tag{2}$$

$$-2.5 < f3/fC < -0.7 \tag{3}$$

$$0 < \nu1 - \nu2 < 10 \tag{4}$$

Furthermore, in the rear converter lens according to the present disclosure, it is preferable that, assuming that a focal length of the third lens group-first lens is f31 and a focal length of the third lens group-second lens is f32, Conditional Expressions (5) and (6) are satisfied.

$$0.3 < f31/f3 < 0.8 \tag{5}$$

$$-2.5 < f32/f3 < -0.6 \tag{6}$$

Furthermore, in the rear converter lens according to the present disclosure, it is preferable that at least one of lens surfaces of the third lens group-first lens is aspherical.

In the rear converter lens according to the present disclosure, it is preferable that, in Conditional Expression (1), Conditional Expression (1-1) is further satisfied.

$$-1.3 < f1/fC < -0.9 \tag{1-1}$$

In the rear converter lens according to the present disclosure, it is preferable that, in Conditional Expression (2), Conditional Expression (2-1) is further satisfied.

$$0.25 < f2/fC < 0.4 \tag{2-1}$$

In the rear converter lens according to the present disclosure, it is preferable that, in Conditional Expression (3), Conditional Expression (3-1) is further satisfied.

$$-2.2 < f3/fC < -0.8 \tag{3-1}$$

In the rear converter lens according to the present disclosure, it is preferable that, in Conditional Expression (4), Conditional Expression (4-1) is further satisfied.

$$3 < \nu1 - \nu2 < 8 \tag{4-1}$$

In the rear converter lens according to the present disclosure, it is preferable that, in Conditional Expression (5), Conditional Expression (5-1) is further satisfied.

$$0.4 < f31/f3 < 0.7 \quad (5\text{-}1)$$

In the rear converter lens according to the present disclosure, it is preferable that, in Conditional Expression (6), Conditional Expression (6-1) is further satisfied.

$$-2.2 < f32/f3 < -0.7 \quad (6\text{-}1)$$

An imaging apparatus according to the present disclosure comprises the rear converter lens according to the present disclosure described above.

It should be noted that the term "consist of ~" means that the rear converter lens may include not only the above-mentioned elements but also lenses substantially having no powers, optical elements which are not lenses, such as a stop, a mask, a cover glass, or a filter, and mechanism parts such as a lens flange, a lens barrel, an imaging element, or a camera shaking correction mechanism.

The Abbe number in each conditional expression is based on the d line as a reference wavelength.

Signs of refractive powers and surface shapes of the lenses are assumed as those in paraxial regions in a case where some lenses have aspheric surfaces.

According to the present disclosure, it is possible to provide a rear converter lens having good optical performance that is compatible with an optical system with a small F number, and an imaging apparatus.

BRIEF DESCRIPTION OF THE DRAWINGS

Exemplary embodiments according to the technique of the present disclosure will be described in detail based on the following figures, wherein.

DETAILED DESCRIPTION

Figure 1:
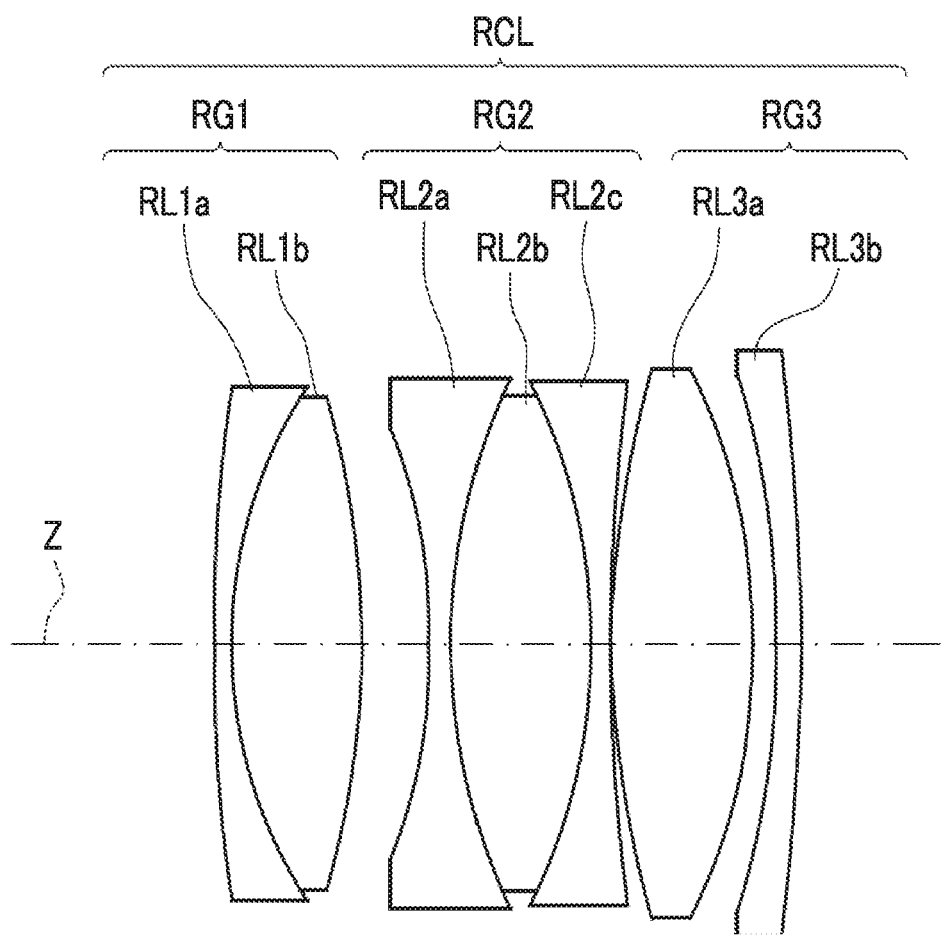
FIG. 1 is a cross-sectional view showing a configuration example of a rear converter lens according to an embodiment of the present disclosure.
Figure 2:
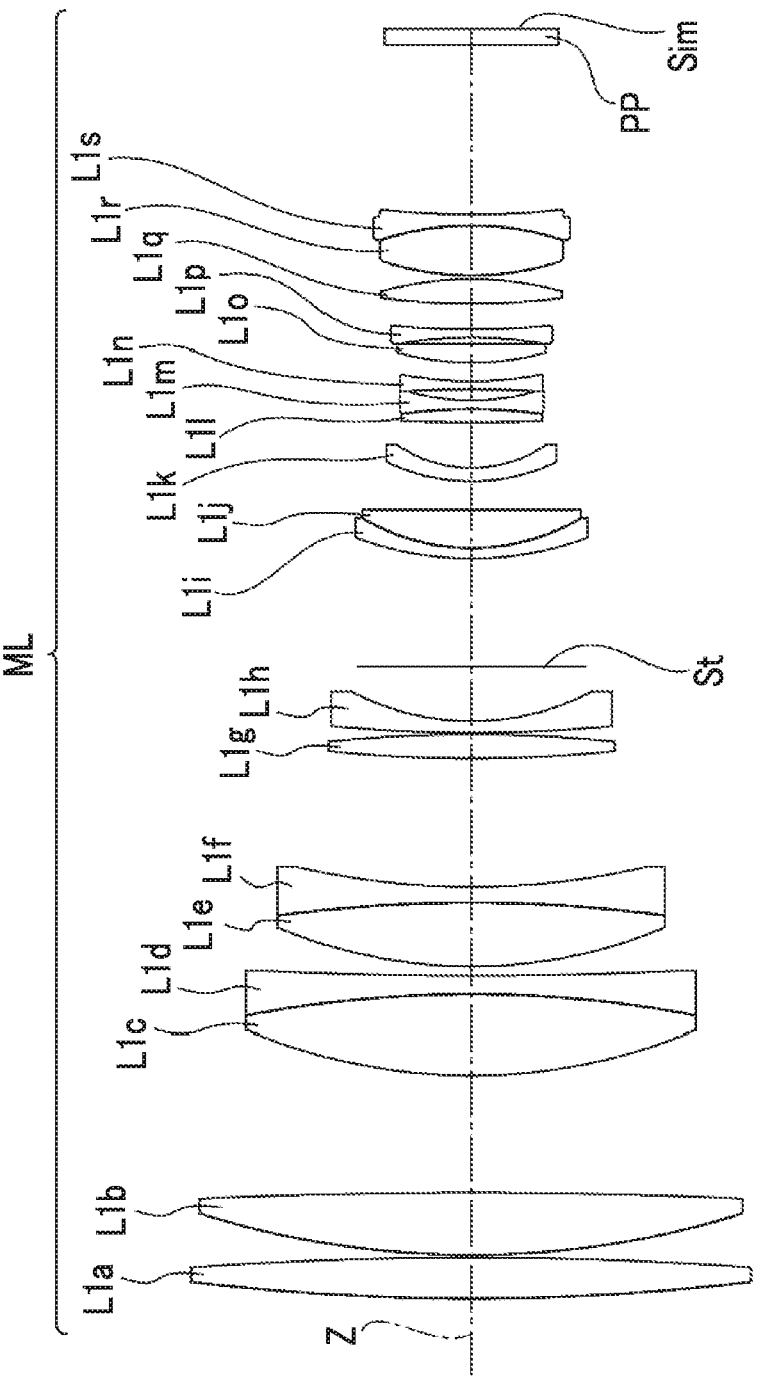
FIG. 2 is a cross-sectional view showing a configuration example of a master lens on which the rear converter lens is mounted.
Figure 3:
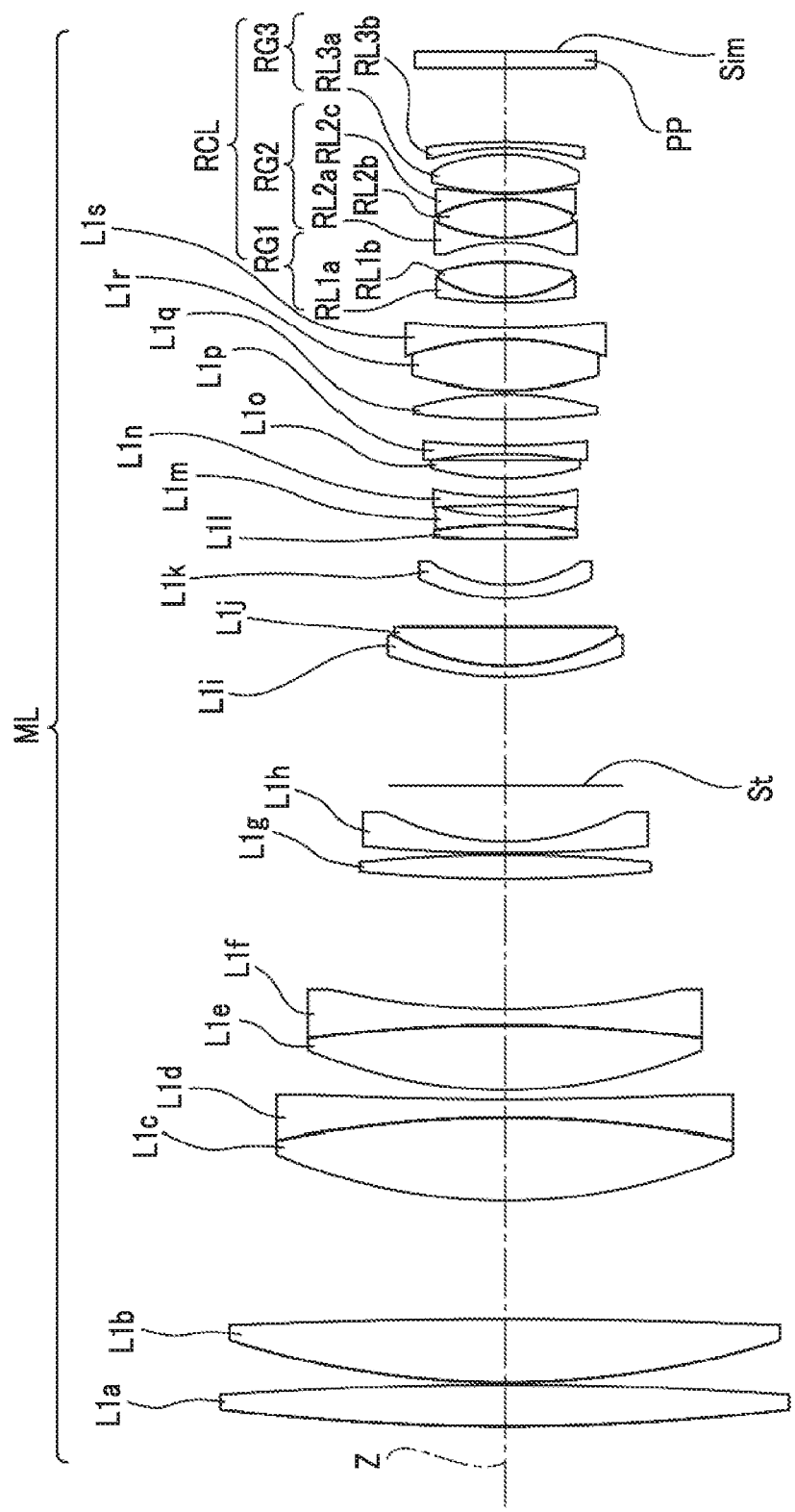
FIG. 3 is a cross-sectional view showing a lens configuration in a state where a rear converter lens of Example 1 is mounted on the master lens.
Figure 4:
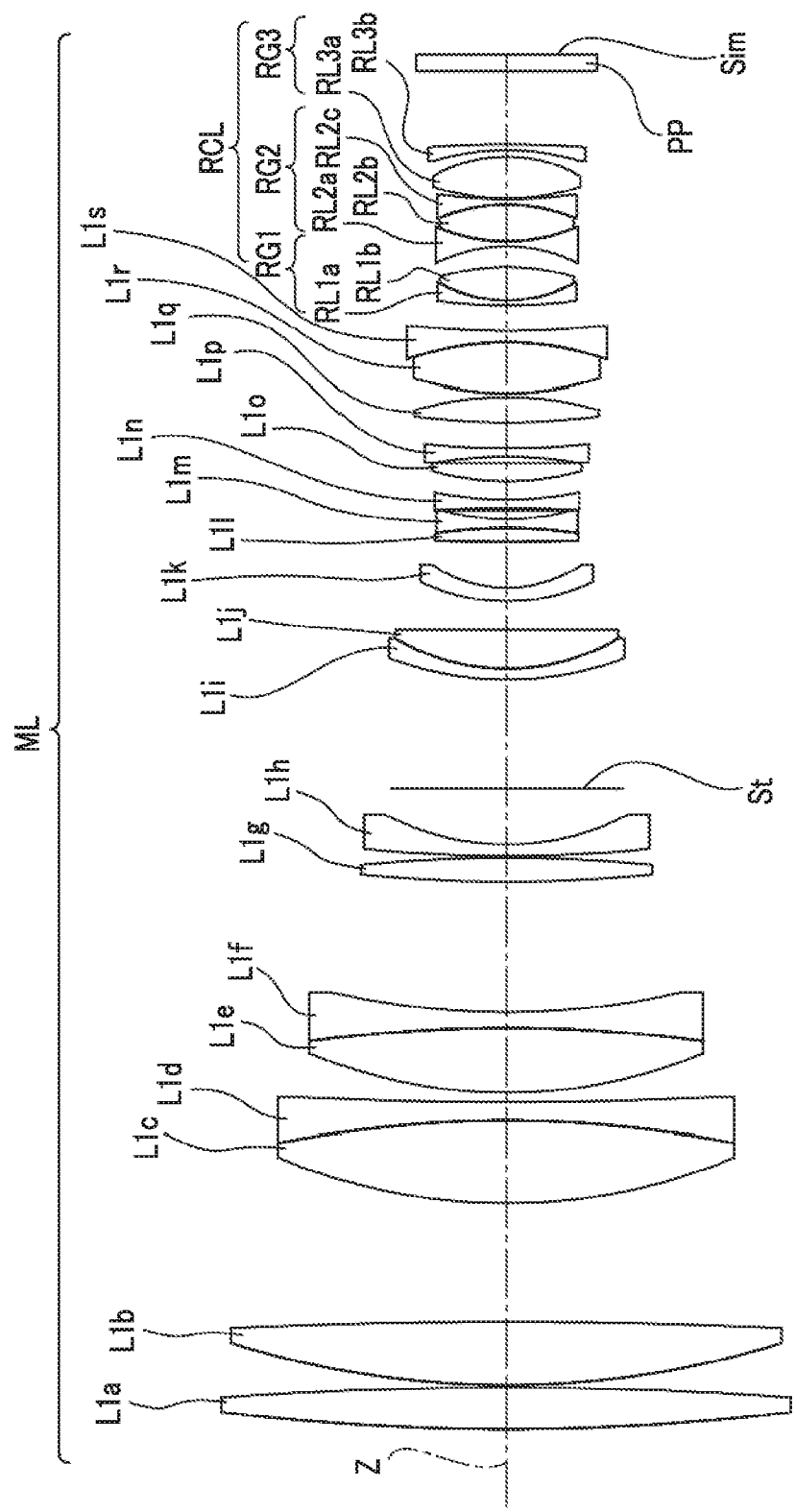
FIG. 4 is a cross-sectional view showing a lens configuration in a state where a rear converter lens of Example 2 is mounted on the master lens.
Figure 5:
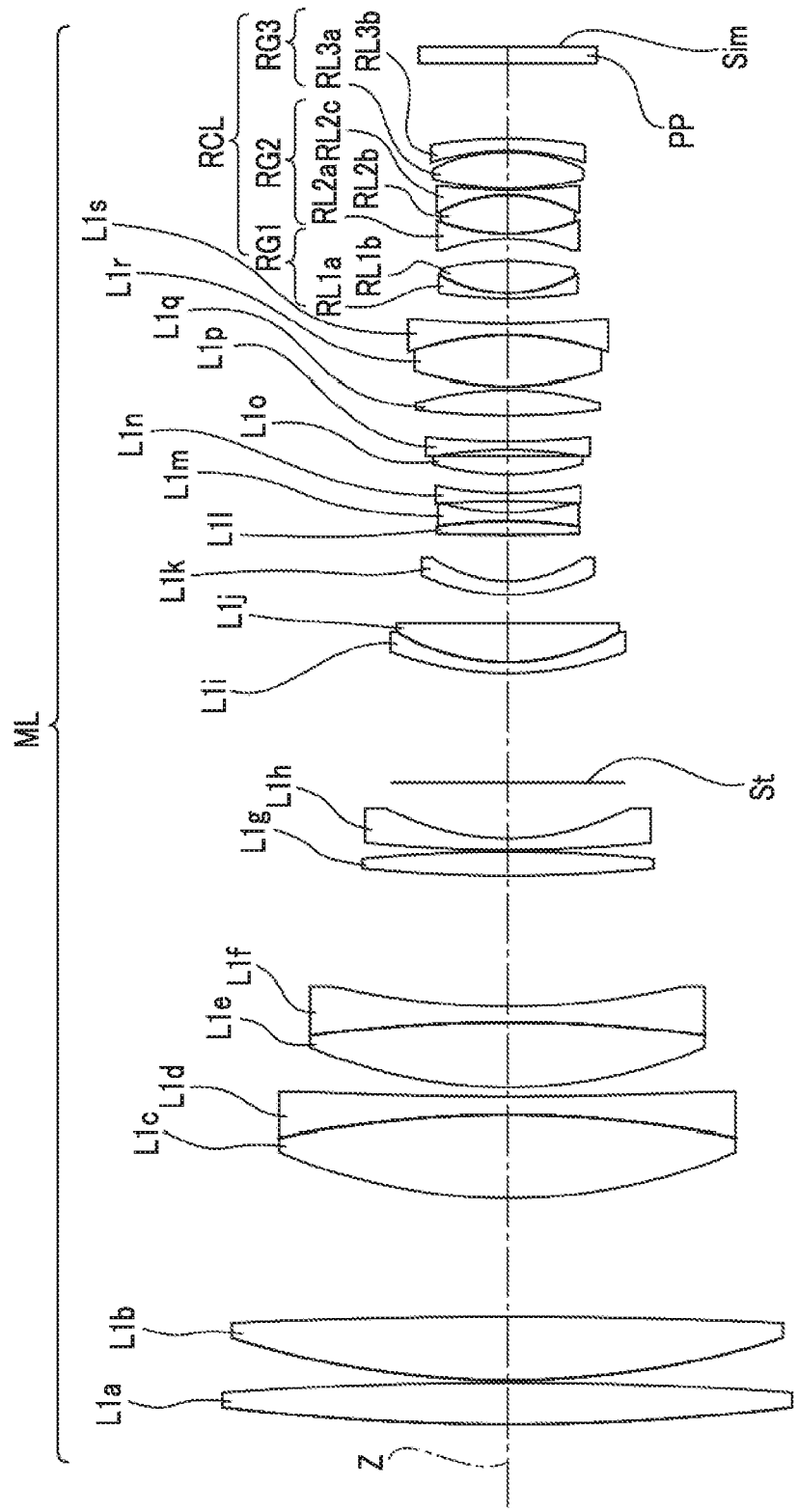
FIG. 5 is a cross-sectional view showing a lens configuration in a state where a rear converter lens of Example 3 is mounted on the master lens.
Figure 6:
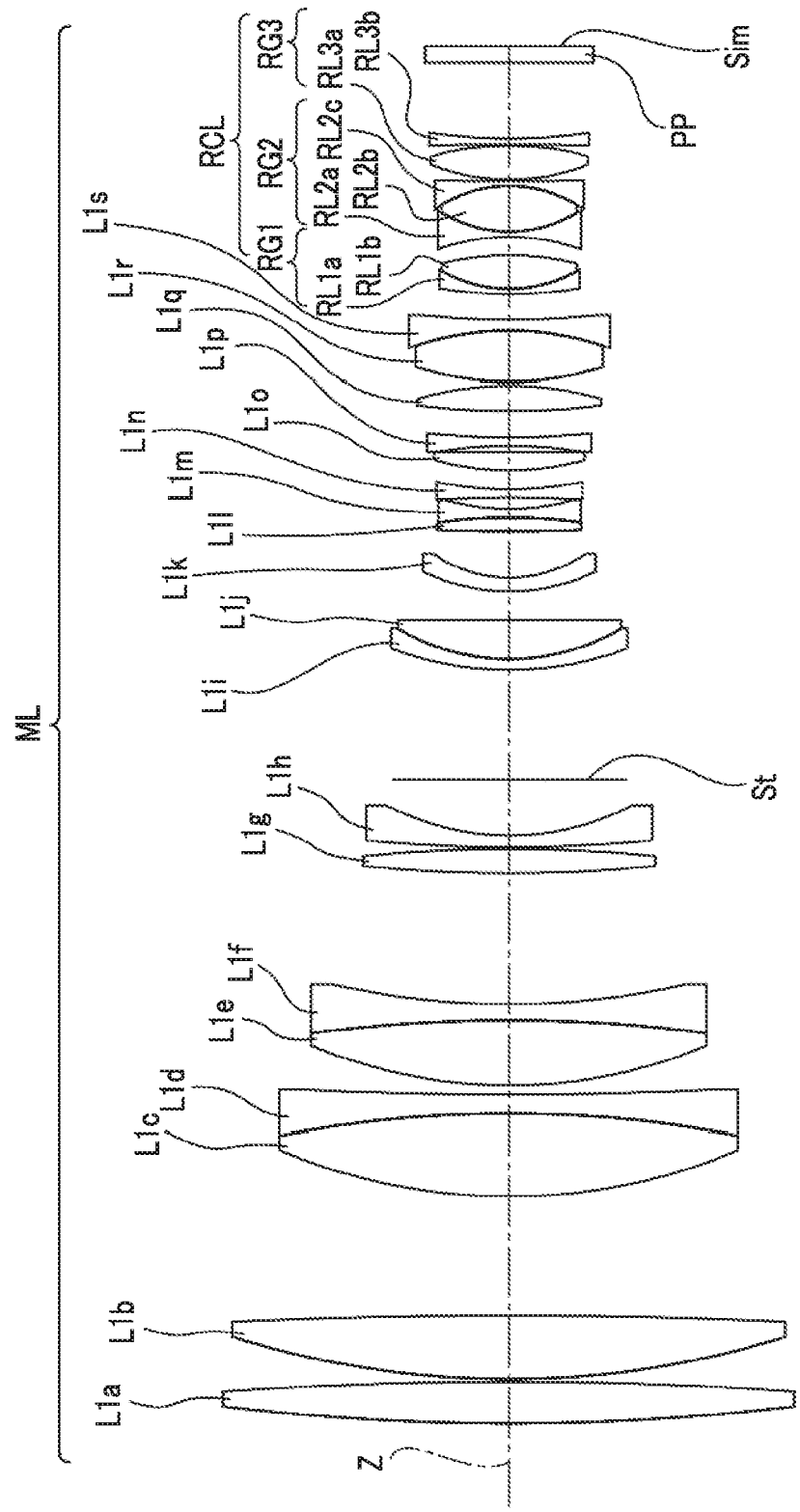
FIG. 6 is a cross-sectional view showing a lens configuration in a state where a rear converter lens of Example 4 is mounted on the master lens.
Figure 7:
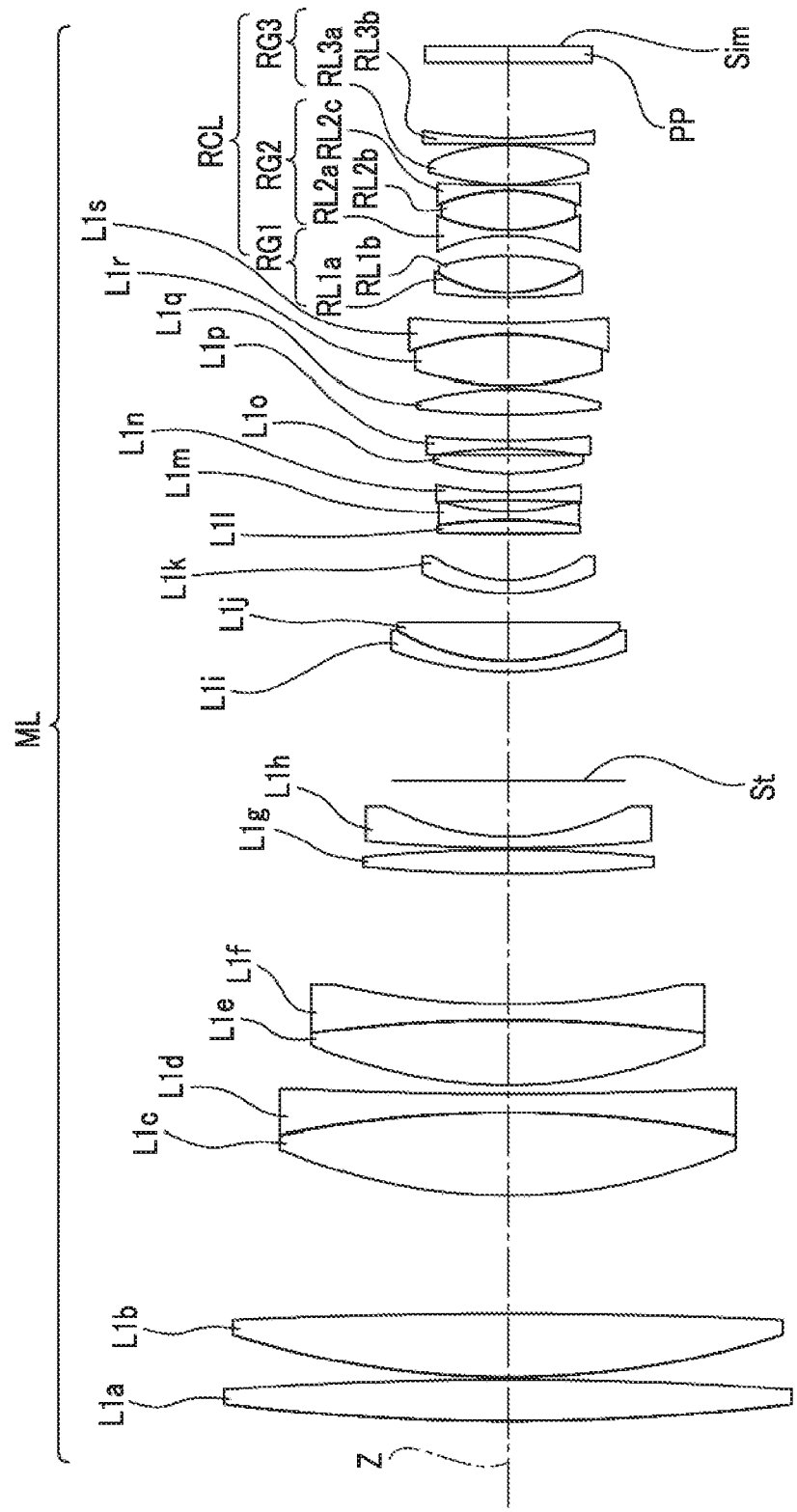
FIG. 7 is a cross-sectional view showing a lens configuration in a state where a rear converter lens of Example 5 is mounted on the master lens.

Hereinafter, a rear converter lens of the present disclosure will be described in detail with reference to drawings. FIG. 1 is a cross-sectional view showing an example of the lens configuration of a rear converter lens RCL according to an embodiment of the present disclosure. The rear converter lens RCL shown in FIG. 1 corresponds to the rear converter lens RCL of Example 1 to be described later. FIG. 2 is a cross-sectional view showing an example of the lens configuration of a master lens ML on which the rear converter lens RCL is mounted. FIGS. 3 to 7 are cross-sectional views showing entire configurations in a state where respective rear converter lenses RCL in Examples 1 to 5 to be described later are mounted on the master lens ML shown in FIG. 2. In FIGS. 1 to 7, left is the object side, and right is the image side. It should be noted that the aperture stop St of FIGS. 1 to 7 is not necessarily drawn to represent its size and/or shape, and represents a position of the aperture stop St on an optical axis Z.

The rear converter lens RCL is mounted on the image side of the master lens ML. The rear converter lens RCL has a negative refractive power, and the focal length of an optical system in which the rear converter lens RCL is mounted on the master lens ML is larger than that of the master lens ML alone. Hereinafter, the whole optical system in which the rear converter lens RCL is mounted on the master lens ML may be simply referred to as a synthetic optical system.

The rear converter lens RCL consists of, in order from the object side, along the optical axis Z, a first lens group RG1 that has a positive refractive power; a second lens group RG2 that has a negative refractive power; and a third lens group RG3 that has a positive refractive power.

As described above, the three lens groups of the first lens group RG1 to the third lens group RG3 are set to have positive, negative, and positive refractive powers, respectively, and accordingly, it is possible to suppress fluctuation in spherical aberration and field curvature by mounting the rear converter lens RCL on the master lens ML.

Further, in the rear converter lens RCL, the following effects can be obtained by setting the first lens group RG1 to have a positive refractive power. That is, by setting the first lens group RG1 to have a positive refractive power, the object side principal point position (also referred to as the front principal point position) of the rear converter lens RCL can be made closer to image side, and as a result, the back focal length of the synthetic optical system can be made shortened.

The rear converter lens RCL is disposed at a position where the image point position (image side focal position) of the master lens ML matches the object point position of the rear converter lens RCL on the image side of the master lens ML. Then, the object distance and the imaging distance of the rear converter lens RCL are determined so as to obtain a target enlarging magnification.

Here, the object distance is the distance from the object side principal point position of the rear converter lens RCL to the object point position. The imaging distance is the distance from the image side principal point position (rear principal point position) of the rear converter lens RCL to the imaging position at which the image of the master lens ML is re-imaged by the rear converter lens RCL (see image plane Sim shown in FIG. 3). Assuming that the object distance is a, the imaging distance is b, and the enlarging magnification in a case where the rear converter lens RCL is mounted is M, M=b/a.

In a state where the object point position of the rear converter lens RCL is fixed, in a case where the object side principal point position of the rear converter lens RCL moves to the image side, the object distance a becomes shorter, and in a case where the enlarging magnification M is constant, the imaging distance b become shorter. In this way, the back focal length of the synthetic optical system can be shortened. As described above, in a case where the object side principal point position of the rear converter lens RCL is moved to the image side, the back focal length of the synthetic optical system can be shortened. For this reason, the specification suitable for the non-reflex digital camera can be obtained.

The first lens group RG1 consists of a cemented lens in which a negative lens RL1a concave toward the image side and a positive lens RL1b convex toward the object side are cemented in order from the object side.

By using such a cemented lens, it is possible to suppress fluctuation in longitudinal chromatic aberration caused by mounting the rear converter lens RCL on the master lens ML. Further, by cementing the two lenses in the first lens group RG1, it is possible to suppress occurrence of ghost between the lens surfaces, and to reduce the effect of relative position error between the lenses.

The second lens group RG2 consists of a cemented lens in which three lenses, that is, a negative lens RL2a concave toward the image side, a positive lens RL2b convex toward both sides, and a negative lens RL2c concave toward the object side are cemented in order from the object side.

The second lens group RG2 consists of a pair of cemented lenses, in which, in order from the object side, a negative lens RL2a, a positive lens RL2b, and a negative lens RL2c are cemented. In the second lens group RG2 having a negative refractive power, in a case where the negative refractive power is increased to ensure sufficient negative refractive power, longitudinal chromatic aberration caused by mounting the rear converter lens RCL tends to change greatly. However, since the second lens group RG2 is composed of a pair of cemented lenses, in which, three lenses, that is, in order from the object side, a negative lens RL2a, a positive lens RL2b, and a negative lens RL2c are cemented, it is possible to suppress fluctuation in longitudinal chromatic aberration caused by mounting the rear converter lens RCL. Further, by setting the second lens group RG2 to be a cemented lens, it is possible to suppress occurrence of ghost between the lens surfaces, and to reduce the effect of relative position error between the lenses.

The third lens group RG3 consists of, in order from the object side, a third lens group-first lens RL3a and a third lens group-second lens RL3b. The third lens group-first lens RL3a is a positive lens convex toward the object side, and the third lens group-second lens RL3b is a negative lens. In the third lens group RG3, by forming the object side lens surface of the third lens group-first lens RL3a positioned on the object side into a convex surface, it is possible to suppress fluctuation in spherical aberration caused by mounting the rear converter lens RCL on the master lens ML.

In the third lens group RG3, by setting the third lens group-second lens RL3b to be a negative lens, it is possible to make the object side principal point position of the rear converter lens RCL move closer to the image side. Thus, it is possible to shorten the back focal length of the synthetic optical system after the rear converter lens RCL is mounted on the master lens ML. For this reason, the specification suitable for the non-reflex digital camera can be obtained.

The rear converter lens RCL is configured to satisfy the following conditional expressions.

First, assuming that a focal length of the first lens group RG1 is f1, a focal length of the second lens group RG2 is f2, a focal length of the third lens group RG3 is f3, and a focal length of the whole rear converter lens RCL is fC, the rear converter lens RCL is configured to satisfy Conditional Expressions (1) to (3).

$$1.4 < f1/fC < -0.8 \quad (1)$$

$$0.2 < f2/fC < 0.5 \quad (2)$$

$$-2.5 < f3/fC < -0.7 \quad (3)$$

Conditional Expression (1) represents a suitable condition for the rear converter lens RCL having good optical performance which enables relatively short back focal length suitable for a non-reflex digital camera and can be also compatible with an optical system with a small F number. Here, "small F number" means that the F number is 3 or less.

As the focal length f1 of the first lens group RG1 is increased (as the positive refractive power is weakened), the object side principal point position of the rear converter lens RCL shifts to the object side.

By not allowing the value of f1/fC to be equal to or less than the lower limit of Conditional Expression (1), the object side principal point position of the rear converter lens RCL is prevented from becoming excessively close to the object side. In a state where the object point position of the rear converter lens RCL is fixed, in a case where the object side principal point position of the rear converter lens RCL moves to the object side, the object distance a becomes longer, and in a case where the enlarging magnification M is constant, the imaging distance b become longer. As a result, the back focal length of the synthetic optical system also becomes longer. Therefore, by not allowing the value of f1/fC to be equal to or less than the lower limit of Conditional Expression (1), the back focal length of the synthetic optical system can be prevented from becoming excessively long, which makes it possible to suppress increase in the lens length of the whole synthetic optical system.

Even in a case where the value of f1/fC is equal to or less than the lower limit of Conditional expression (1), it is possible to shorten the back focal length of the synthetic optical system by reducing the enlarging magnification M. However, in this case, there is a possibility that the target enlarging magnification M is not obtained. Therefore, it is necessary not to allow the value of f1/fC to be equal to or less than the lower limit of Conditional Expression (1).

Further, by not allowing the value of f1/fC to be equal to or less than the lower limit of Conditional Expression (1), increase in the spherical aberration is suppressed, which is advantageous for correction of the spherical aberration.

On the other hand, by not allowing the value of f1/fC to be equal to or greater than the upper limit of Conditional Expression (1), it is possible to prevent the object side principal point position of the rear converter lens RCL from becoming excessively close to the image side. As described above, in a state where the object point position of the rear converter lens RCL is fixed, in a case where the object side principal point position of the rear converter lens RCL moves to the image side, the object distance a also becomes shorter, and in a case where the enlarging magnification M is constant, the imaging distance b and the back focal length also become shorter. Therefore, by not allowing the value of f1/fC to be equal to or greater than the upper limit of Conditional Expression (1), it is possible to prevent the back focal length of the synthetic optical system from becoming excessively short. As a result, it is possible to ensure the back focal length of the synthetic optical system, which is also required for non-reflex digital cameras.

Further, by not allowing the value of f1/fC to be equal to or greater than the upper limit of Conditional Expression (1), increase in field curvature is suppressed, which is advantageous for correction of field curvature.

Further, in Conditional Expression (1), in a case where following Conditional Expression (1-1) is further satisfied, better optical performance can be obtained.

$$-1.3 < f1/fC < -0.9 \tag{1-1}$$

Conditional Expression (2) also represents a suitable condition for the rear converter lens RCL having good optical performance which enables relatively short back focal length suitable for a non-reflex digital camera and can be also compatible with an optical system with a small F number.

By not allowing the value of f2/fC to be equal to or less than the lower limit of Conditional Expression (2), it is possible to prevent the object side principal point position of the rear converter lens RCL from becoming excessively close to the image side. In a case where the refractive power of the whole rear converter lens RCL is constant (fC is constant), as the focal length f2 of the second lens group RG2 is reduced (as the negative refractive power becomes stronger), the positive refractive power of the first lens group RG1 becomes stronger. As described above, as the positive refractive power of the first lens group RG1 becomes stronger, the object side principal point position of the rear converter lens RCL shifts to the image side. In a state where the object point position of the rear converter lens RCL is fixed, in a case where the object side principal point position of the rear converter lens RCL moves to the image side, the object distance a becomes shorter, and in a case where the enlarging magnification M is constant, the imaging distance b and the back focal length also become shorter. Therefore, by not allowing the value of f2/fC to be equal to or less than the lower limit of Conditional Expression (2), it is possible to prevent the back focal length of the synthetic optical system from becoming excessively short. As a result, it is possible to ensure the back focal length of the synthetic optical system, which is also required for non-reflex digital cameras.

Further, by not allowing the value of f2/fC to be equal to or less than the lower limit of Conditional Expression (2), increase in the spherical aberration is suppressed, which is advantageous for correction of the spherical aberration.

On the other hand, under the same assumptions as in the description in the case of not allowing the value of f2/fC to be equal to or less than the lower limit of Conditional Expression (2), by not allowing the value of f2/fC to be equal to or greater than the upper limit of Conditional Expression (2), it is possible to prevent the object side principal point position of the rear converter lens RCL from becoming excessively close to the object side. Accordingly, the back focal length of the synthetic optical system can be prevented from becoming excessively long, which makes it possible to suppress increase in the lens length of the whole synthetic optical system.

Even in a case where the value of f2/fC is equal to or greater than the upper limit of Conditional Expression (2), it is possible to shorten the back focal length of the synthetic optical system by reducing the enlarging magnification M. However, in this case, there is a possibility that the target enlarging magnification M is not obtained. Therefore, it is necessary not to allow the value of f2/fC to be equal to or greater than the upper limit of Conditional Expression (2).

Further, by not allowing the value of f2/fC to be equal to or greater than the upper limit of Conditional Expression (2), the increase in field curvature is suppressed, which is advantageous for correction of field curvature.

Further, in Conditional Expression (2), in a case where following Conditional Expression (2-1) is further satisfied, better optical performance can be obtained.

$$0.25 < f2/fC < 0.4 \tag{2-1}$$

Conditional Expression (3) also represents a suitable condition for the rear converter lens RCL having good optical performance which enables relatively short back focal length suitable for a non-reflex digital camera and can be also compatible with an optical system with a small F number.

By not allowing the value of f3/fC to be equal to or less than the lower limit of Conditional Expression (3), it is possible to prevent the object side principal point position of the rear converter lens RCL from becoming excessively close to the image side. In a case where the refractive power of the whole rear converter lens RCL is constant (fC is constant), as the focal length f3 of the third lens group RG3 is increased (as the positive refractive power is weakened), the positive refractive power of the first lens group RG1 becomes stronger. As described above, as the positive refractive power of the first lens group RG1 becomes stronger, the object side principal point position of the rear converter lens RCL shifts to the image side. In a state where the object point position of the rear converter lens RCL is fixed, in a case where the object side principal point position of the rear converter lens RCL moves to the image side, the object distance a becomes shorter, and in a case where the enlarging magnification M is constant, the imaging distance b and the back focal length also become shorter. Therefore, by not allowing the value of f3/fC to be equal to or less than the lower limit of Conditional Expression (3), it is possible to prevent the back focal length of the synthetic optical system from becoming excessively short. As a result, it is possible to ensure the back focal length of the synthetic optical system, which is also required for non-reflex digital cameras.

Further, by not allowing the value of f3/fC to be equal to or less than the lower limit of Conditional Expression (3), the increase in distortion is suppressed, which is advantageous for the correction of the distortion.

On the other hand, under the same assumptions as in the description in the case of not allowing the value of f3/fC to be equal to or less than the lower limit of Conditional Expression (3), by not allowing the value of f3/fC to be equal to or greater than the upper limit of Conditional Expression (3), the object side principal point position and the object point position of the rear converter lens RCL are prevented from becoming excessively close to the object side. Accordingly, the back focal length of the synthetic optical system can be prevented from being excessively long, which makes it possible to suppress increase in the lens length of the whole synthetic optical system.

Even in a case where the value of f3/fC is equal to or greater than the upper limit of Conditional Expression (3), it is possible to shorten the back focal length of the synthetic optical system by reducing the enlarging magnification M. However, in this case, there is a possibility that the target enlarging magnification M is not obtained. Therefore, it is necessary not to allow the value of f3/fC to be equal to or greater than the upper limit of Conditional Expression (3).

Further, by not allowing the value of f3/fC to be equal to or greater than the upper limit of Conditional Expression (3), the increase in the field curvature is suppressed, which is advantageous for the correction of field curvature.

Further, in Conditional Expression (3), in a case where following Conditional Expression (3-1) is further satisfied, better optical performance can be obtained.

$$-2.2<f3/fC<-0.8 \quad (3\text{-}1)$$

Following Conditional Expression (4) also represents a suitable condition for the rear converter lens RCL having good optical performance which can be also compatible with an optical system having a small F number. In particular, Conditional expression (4) represents a condition for suppressing fluctuation in lateral chromatic aberration caused by mounting the rear converter lens RCL on the master lens ML.

Assuming that the Abbe number of the negative lens RL1a of the first lens group RG1 is v1 and the Abbe number of the positive lens RL1b of the first lens group RG1 is v2, it is preferable to satisfy Conditional Expression (4).

$$0<v1-v2<10 \quad (4)$$

By not allowing the value of v1−v2 to be equal to or greater than the upper limit of Conditional Expression (4), it is possible to suppress fluctuation in lateral chromatic aberration caused by mounting the rear converter lens RCL. In addition, by not allowing the value of v1−v2 to be equal to or less than the lower limit of Conditional Expression (4), the increase in longitudinal chromatic aberration can be suppressed, which is advantageous for correction of longitudinal chromatic aberration.

In Conditional Expression (4), in a case where Conditional Expression (4-1) is further satisfied, it is possible to correct lateral chromatic aberration and longitudinal chromatic aberration in a well-balanced manner while further suppressing fluctuation in lateral chromatic aberration.

$$3<v1-v2<8 \quad (4\text{-}1)$$

Furthermore, in a case where Conditional Expressions shown below are satisfied, the rear converter lens RCL having better optical performances can be implemented which enables relatively short back focal length suitable for a non-reflex digital camera and can be also compatible with an optical system with a small F number.

First, assuming that the focal length of the third lens group-first lens RL3a is f31 and the focal length of the third lens group-second lens RL3b is f32, it is preferable to satisfy the following Conditional Expressions (5) and (6).

$$0.3<f31/f3<0.8 \quad (5)$$

$$-2.5<f32/f3<-0.6 \quad (6)$$

By not allowing the value of f31/f3 to be equal to or less than the lower limit of Conditional Expression (5), the object side principal point position of the rear converter lens RCL is prevented from becoming excessively close to the image side. In a state where the refractive power of the whole rear converter lens RCL is kept constant, as the focal length f31 of the third lens group-first lens RL3a is increased (as the positive refractive power is weakened), the positive refractive power of the first lens group RG1 becomes weakened. Therefore, under the same assumptions as in the description of Conditional Expression (3) described above, by not allowing the value of f31/f3 to be equal to or less than the lower limit of Conditional Expression (5), it is possible to prevent the back focal length of the synthetic optical system from becoming excessively short. As a result, it is possible to ensure the back focal length of the synthetic optical system, which is also required for non-reflex digital cameras.

Further, by not allowing the value of f31/f3 to be equal to or less than the lower limit of Conditional Expression (5), the increase in field curvature is suppressed, which is advantageous for correction of field curvature.

On the other hand, under the same assumptions as in the description in the case of not allowing the value of f31/f3 to be equal to or less than the lower limit of Conditional Expression (5), by not allowing the value of f31/f3 to be equal to or greater than the upper limit of Conditional Expression (5), it is possible to prevent the object side principal point position of the rear converter lens RCL from becoming excessively close to the object side. Accordingly, the back focal length of the synthetic optical system can be prevented from becoming excessively long, which makes it possible to suppress increase in the lens length of the whole synthetic optical system.

Even in a case where the value of f31/f3 is equal to or greater than the upper limit of Conditional Expression (5), it is possible to shorten the back focal length of the synthetic optical system by reducing the enlarging magnification M. However, in this case, there is a possibility that the target enlarging magnification M is not obtained. Therefore, it is necessary not to allow the value of f31/f3 to be equal to or greater than the upper limit of Conditional Expression (5).

Further, by not allowing the value of f31/f3 to be equal to or greater than the upper limit of Conditional Expression (5), increase in the spherical aberration is suppressed, which is advantageous for correction of the spherical aberration.

By not allowing the value of f32/f3 to be equal to or greater than the upper limit of Conditional Expression (6), the object side principal point position of the rear converter lens RCL is prevented from becoming excessively close to the image side. As the focal length f32 of the third lens group-second lens RL3b is reduced (as the negative refractive power becomes stronger), the positive refractive power of the third lens group RG3 becomes weakened. In a case where the refractive power of the whole rear converter lens RCL is constant, as the positive refractive power of the third lens group RG3 is weakened, the positive refractive power of the first lens group RG1 becomes stronger. Then, the object side principal point position of the rear converter lens RCL is positioned on the image side, and the back focal length becomes shorter. Therefore, under the same assumptions as in the description of Conditional Expression (3) described above, by not allowing the value of f32/f3 to be equal to or greater than the upper limit of Conditional Expression (6), it is possible to prevent the back focal length of the synthetic optical system from becoming excessively short. As a result, it is possible to ensure the back focal length of the synthetic optical system, which is also required for non-reflex digital cameras.

Further, by not allowing the value of f32/f3 to be equal to or greater than the upper limit of Conditional Expression (6), increase in field curvature is suppressed, which is advantageous for correction of field curvature.

On the other hand, by not allowing the value of f32/f3 to be equal to or less than the lower limit of Conditional Expression (6), the object side principal point position of the rear converter lens RCL is prevented from becoming excessively close to the object side. Accordingly, the back focal length of the synthetic optical system can be prevented from becoming excessively long, which makes it possible to suppress increase in the lens length of the entire synthetic optical system.

Even in a case where the value of f32/f3 is equal to or less than the lower limit of Conditional expression (6), it is possible to shorten the back focal length of the synthetic optical system by reducing the enlarging magnification M. However, in this case, there is a possibility that the target enlarging magnification M is not obtained. Therefore, it is necessary not to allow the value of f32/f3 to be equal to or less than the lower limit of Conditional Expression (6).

Further, by not allowing the value of f32/f3 to be equal to or less than the lower limit of Conditional Expression (6), increase in the spherical aberration is suppressed, which is advantageous for correction of the spherical aberration.

Further, in Conditional Expression (5), in a case where following Conditional Expression (5-1) is further satisfied, better optical performance can be obtained. Further, in Conditional Expression (6), in a case where following Conditional Expression (6-1) is further satisfied, better optical performance can be obtained.

$$0.4 < f31/f3 < 0.7 \quad (5\text{-}1)$$

$$-2.2 < f32/f3 < -0.7 \quad (6\text{-}1)$$

In addition, it is preferable that at least one of lens surfaces of the third lens group-first lens RL3a be formed as an aspheric surface. Thus, spherical aberration, field curvature, and distortion can be simultaneously corrected.

Also, in the present example, the third lens group RG3 consists of single lenses, which are not cemented at all. The configuration of single lenses improves the freedom of design. The third lens group RG3 may be composed of at least one cemented lens.

Next, a configuration example of the master lens ML on which the rear converter lens RCL is mounted, and a numerical example of the rear converter lens RCL will be described.

First, the master lens ML will be described. FIG. 2 is a cross-sectional view of the master lens ML shown as an example. The master lens ML consists of, in order from the object side, nineteen lenses L1a to L1s. The master lens ML may be a zoom lens. In FIG. 2, an example in which a plane-parallel plate-shaped optical member PP is disposed between the master lens ML and the image plane Sim is shown, where the optical member PP is assumed to be a low-pass filter or various types of filters that cut a specific wavelength range.

Specific lens data corresponding to the configuration of the master lens ML alone is shown in Table 1, and data on specifications are shown in Table 2.

In the lens data shown in Table 1, the column of Si shows the surface number designated as the i-th surface number in the optical system, where the surface number sequentially increases toward the image side, with the object side surface of the optical element closest to the object side being regarded as the first surface. The column of the paraxial curvature radius Ri shows the value (mm (millimeter)) of the curvature radius of the i-th surface from the object side. Similarly, the column of a surface distance Di shows the distance (mm (millimeter)) on the optical axis between the i-th surface Si and the (i+1)-th surface Si+1 from the object side. The column of Ndj shows the value of the refractive index at the d line (a wavelength of 587.6 nm (nanometer)) of the j-th optical element from the object side. The column of vdj shows the Abbe number at the d line of the j-th optical element from the object side. Reference signs of curvature radii are set to be positive in a case where the surface shapes are convex toward the object side, and reference signs of curvature radii are set to be negative in a case where of the surface shapes are convex toward the image side. Table 1 also shows an aperture stop St and an optical member PP, in a place of a surface number of a surface corresponding to the aperture stop St, the surface number and the term of (St) are noted.

Table 2 shows the focal length f of the whole system, the back focal length Bf of the whole system, the F number, and the value of the maximum angle of view 2w in a state in which an object at infinity is in focus. In the specification, such as Table 2, "FNo." means "F number". The back focal length Bf represents an air-converted value. In lens data, a) degree (°) is used as a unit of an angle, and mm (millimeter) is used as a unit of a length, but appropriate different units may be used since the optical system can be used even in a case where the system is enlarged or reduced in proportion.

TABLE 1

Master lens・Lens Data

| Si | Ri | Di | Ndj | vdj |
|---|---|---|---|---|
| 1 | 430.7013 | 7.0700 | 1.67270 | 32.10 |
| 2 | −727.3321 | 0.4562 | | |
| 3 | 165.9720 | 10.7500 | 1.43875 | 94.66 |
| 4 | −1120.2835 | 20.2132 | | |
| 5 | 105.9369 | 13.9100 | 1.49700 | 81.54 |
| 6 | −218.3400 | 3.1600 | 1.83481 | 42.74 |
| 7 | 775.7212 | 1.6106 | | |
| 8 | 91.4829 | 11.0200 | 1.49700 | 81.54 |
| 9 | −267.5300 | 2.7200 | 1.91082 | 35.25 |
| 10 | 141.8275 | 22.2150 | | |
| 11 | 266.7587 | 4.1100 | 1.80809 | 22.76 |
| 12 | −266.7587 | 0.3002 | | |
| 13 | 266.7635 | 2.0000 | 1.80000 | 29.84 |
| 14 | 47.2925 | 9.4871 | | |
| 15(St) | ∞ | 18.6296 | | |
| 16 | 61.1684 | 1.8100 | 1.54814 | 45.78 |
| 17 | 39.3800 | 6.6000 | 1.69680 | 55.53 |
| 18 | ∞ | 4.9200 | | |
| 19 | 36.1305 | 2.3000 | 1.60342 | 38.03 |
| 20 | 23.9164 | 7.9000 | | |
| 21 | 415.3848 | 2.2800 | 1.95906 | 17.47 |
| 22 | −91.4760 | 1.5100 | 1.73400 | 51.47 |
| 23 | 42.9219 | 1.8900 | | |
| 24 | −217.2372 | 1.4000 | 1.80100 | 34.97 |
| 25 | 66.6268 | 3.2077 | | |
| 26 | 51.5518 | 3.1100 | 1.90366 | 31.31 |
| 27 | ∞ | 1.0602 | | |
| 28 | −77.9583 | 1.4000 | 1.80809 | 22.76 |
| 29 | 145.8634 | 4.4301 | | |
| 30 | 133.6002 | 4.2800 | 1.80610 | 40.93 |
| 31 | −60.7409 | 0.6043 | | |
| 32 | 53.2520 | 8.6300 | 1.65412 | 39.73 |
| 33 | −53.2520 | 1.9000 | 1.80000 | 29.84 |
| 34 | 154.3014 | 29.2741 | | |
| 35 | ∞ | 2.8500 | 1.51680 | 64.20 |
| 36 | ∞ | 0.0000 | | |

TABLE 2

Master lens・Specification (d line)

| | |
|---|---|
| f | 194.02 |
| Bf | 31.15 |
| FNo. | 2.06 |
| 2ω | 9.0 |

Figure 8:
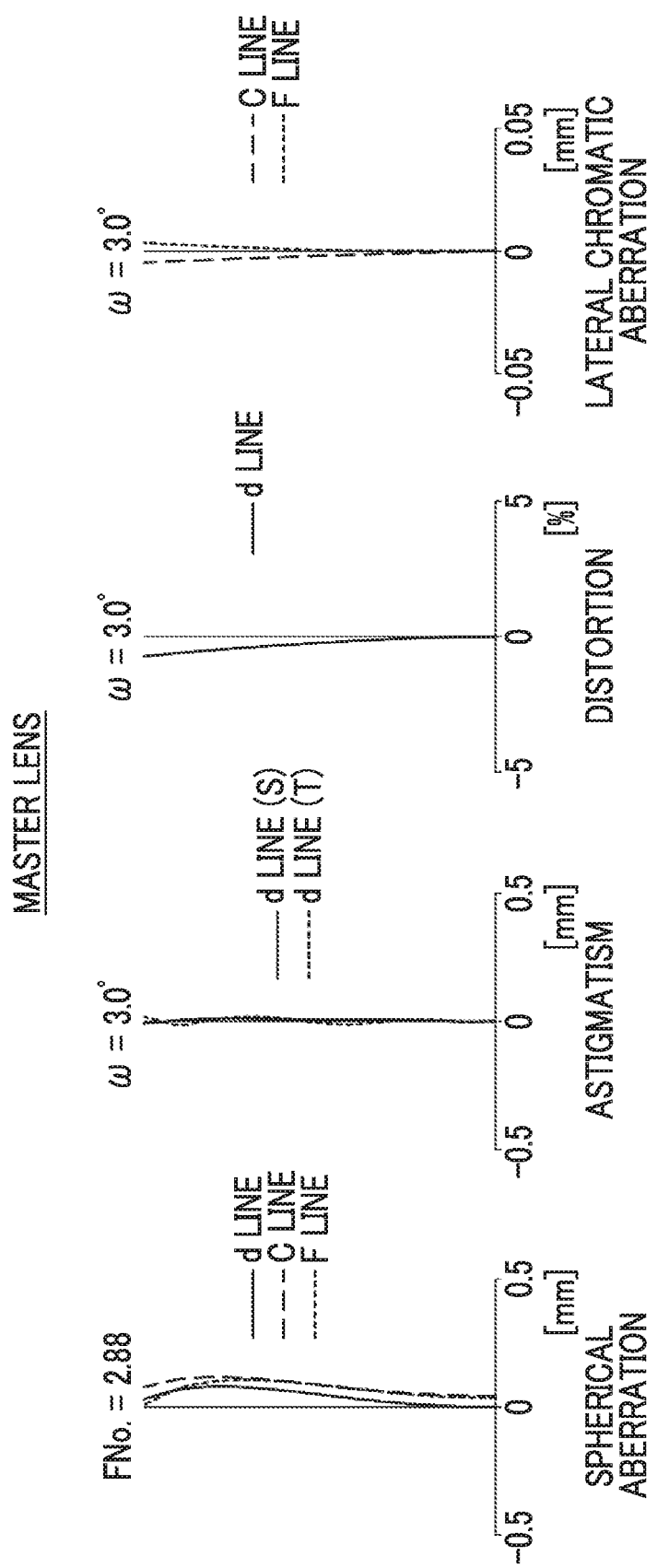
FIG. 8 is a diagram of aberrations of the master lens.

Aberrations of the master lens ML alone are shown in FIG. 8. In FIG. 8, spherical aberration, astigmatism, distortion, and lateral chromatic aberration are shown in order from the left side. The aberration diagrams showing spherical aberration, astigmatism, and distortion show aberration with the d line (a wavelength of 587.6 nm (nanometer)) as the reference wavelength. In the spherical aberration diagram, aberration at the d line (a wavelength of 587.6 nm (nanometers)), the C line (a wavelength of 656.3 nm (nanometers)), and the F line (a wavelength of 486.1 nm (nanometers)), are respectively indicated by the solid line, the long dashed line, and the short dashed line. In the astigmatic diagram, aberrations in the sagittal direction and tangential direction are indicated by the solid line and the short dashed line, respectively. In the lateral chromatic aberration diagram, aberrations at the C line (a wavelength of 656.3 nm (nanometers)), and the F line (a wavelength of 486.1 nm (nanometers)), are respectively indicated by the long dashed line, and the short dashed line. In each aberration diagram, w means a half angle of view. The aberration diagrams shown in FIG. 8 are all for the case where the object distance is at infinity.

FIGS. 3 to 7 are cross-sectional views showing the entire configuration of the synthetic optical system in a state where respective rear converter lenses RCL corresponding to Examples 1 to 5 are mounted on the master lens ML shown in FIG. 2. In FIGS. 3 to 7, the master lens ML is common to all. In the synthetic optical system shown in FIGS. 3 to 7, an example in which the optical member PP is also disposed is shown, as in FIG. 2. Numerical examples of the rear converter lens RCL are shown in Tables 3 to 17 below. The lens data shown in Tables 3 to 17 below is data in a state where the rear converter lens RCL of each of Examples 1 to 5 is mounted on the master lens ML.

In Tables 3 to 17, the meanings of the symbols in the tables are basically the same as those described in Tables 1 and 2. Lens data on the rear converter lens RCL in Example 1 to 5 correspond to surface numbers 35 to 45 shown by bold frames in Tables 3, 6, 9, 12 and 15.

Further, the focal length f of the whole system shows the focal length of the master lens ML alone in Table 2, and in Tables 4, 7, 10, 13 and 16, the synthetic focal length of the synthetic optical system in which the rear converter lens RCL and the master lens ML are combined is shown. The back focal length Bf of the whole system shows the back focal length of the master lens alone in Table 2, and in Tables 4, 7, 10, 13 and 16, the back focal length of the synthetic optical system in which the rear converter lens RCL and the master lens ML are combined is shown.

FIGS. 9 to 13 show aberration diagrams of the synthetic optical system in a state where respective rear converter lenses RCL according to Examples 1 to 5 are mounted on the master lens ML. The meanings of symbols in the aberration diagrams shown in FIGS. 9 to 13 are basically the same as the meanings described in FIG. 8. The aberration diagrams shown in FIGS. 9 to 13 are all for the case where the object distance is at infinity.

In the lens data of Tables 5, 8, 11, 14, and 17, the reference sign * is attached to surface numbers of aspheric surfaces, and numerical values of the paraxial curvature radius of are shown as the curvature radius of the aspheric surface. The data on the aspheric coefficients in Tables 5, 8, 11, 14, and 17 show surface numbers for the aspheric surfaces and the aspheric coefficients for the aspheric surfaces. In Tables 5, 8, 11, 14, and 17, the "E±n" (n: an integer) in numerical values of the aspheric coefficients indicates "×10$^{\pm n}$". The aspheric coefficients are values of the coefficients KA and Am (m=3, 4, 5, ... ) in aspheric surface expression represented as the following expression;

$$Zd = C \cdot h^2 / \{1 + (1 - KA \cdot C^2 \cdot h^2)^{1/2}\} \Sigma Am \cdot h^m,$$

where Zd is an aspherical depth (from a point on the aspheric surface of the height h, the length of the perpendicular drawn down to the plane perpendicular to the optical axis with which the aspherical apex contacts), h is the height (the distance from the optical axis), C is an inverse of the paraxial curvature radius, and KA, Am are aspheric coefficients (m=3, 4, 5, ... ).

Table 3 shows lens data of the synthetic optical system in which the rear converter lens RCL of Example 1 is mounted on the master lens ML, Table 4 shows data on specifications, and Table 5 shows data on aspheric coefficients.

Figure 9:
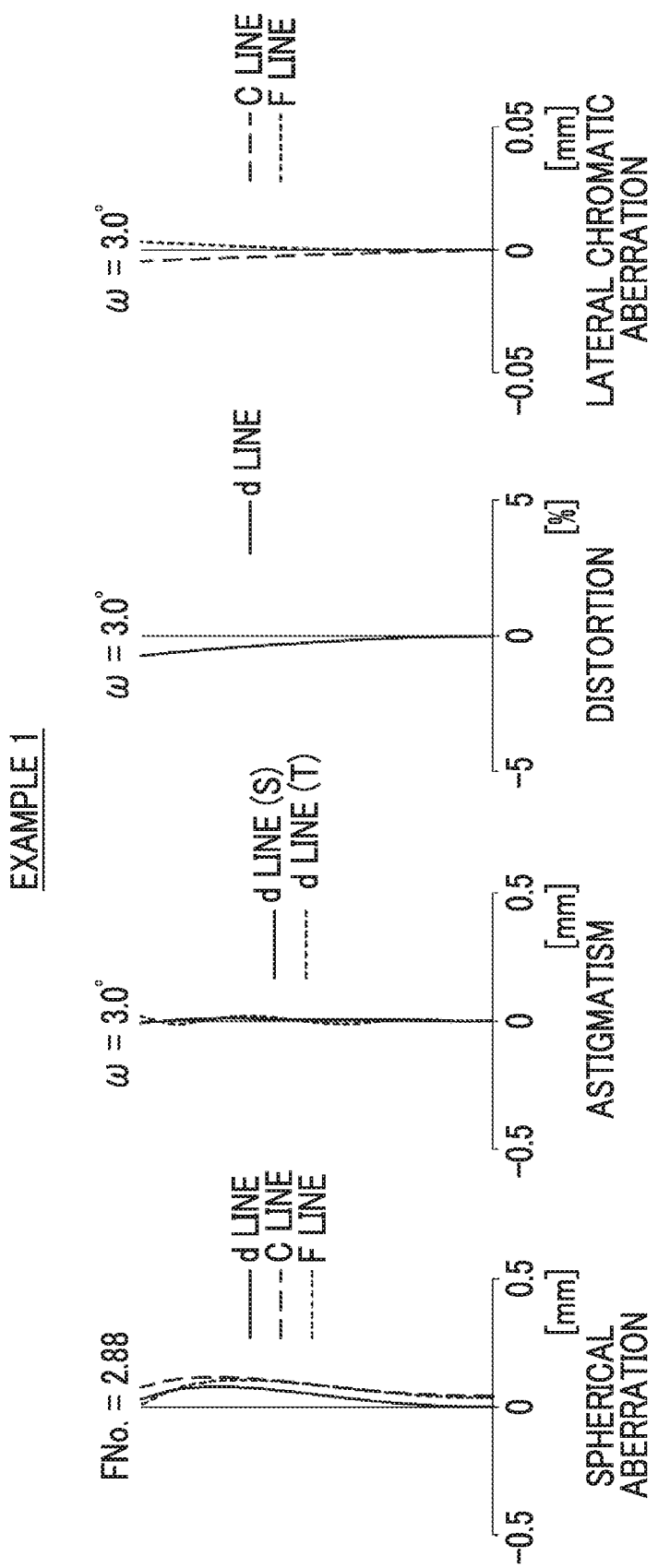
FIG. 9 is a diagram of aberrations in a state where the rear converter lens of Example 1 is mounted on the master lens.

FIG. 9 is a diagram of aberrations in a state where the rear converter lens RCL of Example 1 is mounted on the master lens ML.

TABLE 3

Example 1·Lens Data

| Si | Ri | Di | Ndj | vdj |
|---|---|---|---|---|
| 1 | 430.7013 | 7.0700 | 1.67270 | 32.10 |
| 2 | −727.3321 | 0.4562 | | |
| 3 | 165.9720 | 10.7500 | 1.43875 | 94.66 |
| 4 | −1120.2835 | 20.2132 | | |
| 5 | 105.9369 | 13.9100 | 1.49700 | 81.54 |
| 6 | −218.3400 | 3.1600 | 1.83481 | 42.74 |
| 7 | 775.7212 | 1.6106 | | |
| 8 | 91.4829 | 11.0200 | 1.49700 | 81.54 |
| 9 | −267.5300 | 2.7200 | 1.91082 | 35.25 |
| 10 | 141.8275 | 22.2150 | | |
| 11 | 266.7587 | 4.1100 | 1.80809 | 22.76 |
| 12 | −266.7587 | 0.3002 | | |
| 13 | 266.7635 | 2.0000 | 1.80000 | 29.84 |
| 14 | 47.2925 | 9.4871 | | |
| 15(St) | ∞ | 18.6296 | | |
| 16 | 61.1684 | 1.8100 | 1.54814 | 45.78 |
| 17 | 39.3800 | 6.6000 | 1.69680 | 55.53 |
| 18 | ∞ | 4.9200 | | |
| 19 | 36.1305 | 2.3000 | 1.60342 | 38.03 |
| 20 | 23.9164 | 7.9000 | | |
| 21 | 415.3848 | 2.2800 | 1.95906 | 17.47 |
| 22 | −91.4760 | 1.5100 | 1.73400 | 51.47 |
| 23 | 42.9219 | 1.8900 | | |
| 24 | −217.2372 | 1.4000 | 1.80100 | 34.97 |
| 25 | 66.6268 | 3.2077 | | |
| 26 | 51.5518 | 3.1100 | 1.90366 | 31.31 |
| 27 | ∞ | 1.0602 | | |
| 28 | −77.9583 | 1.4000 | 1.80809 | 22.76 |
| 29 | 145.8634 | 4.4301 | | |
| 30 | 133.6002 | 4.2800 | 1.80610 | 40.93 |
| 31 | −60.7409 | 0.6043 | | |
| 32 | 53.2520 | 8.6300 | 1.65412 | 39.68 |
| 33 | −53.2520 | 1.9000 | 1.80000 | 29.84 |
| 34 | 154.3014 | 4.2900 | | |
| 35 | 80.6062 | 0.9300 | 1.88300 | 39.22 |
| 36 | 22.9970 | 6.0300 | 1.64769 | 33.84 |
| 37 | −42.1232 | 3.2700 | | |
| 38 | −29.2310 | 0.9300 | 1.88300 | 39.22 |
| 39 | 29.2310 | 6.4900 | 1.72825 | 28.32 |
| 40 | −29.2310 | 0.9300 | 1.88300 | 39.22 |
| 41 | 75.0001 | 0.1000 | | |
| *42 | 43.0957 | 6.6300 | 1.51633 | 64.06 |
| *43 | −34.2796 | 1.1000 | | |
| 44 | −48.6590 | 1.0000 | 1.95906 | 17.47 |
| 45 | −108.7770 | 12.5726 | | |
| 46 | ∞ | 2.8500 | 1.51680 | 64.20 |
| 47 | ∞ | 0.0000 | | |

TABLE 4

| Example 1•Specification (d line) | |
|---|---|
| f | 271.54 |
| Bf | 14.45 |
| FNo. | 2.88 |
| 2ω | 6.8 |

TABLE 5

Example 1•Aspheric Coefficients

| Si | *42 | *43 |
|---|---|---|
| KA | 1.0000000E+00 | 1.0000000E+00 |
| A3 | 0.0000000E+00 | 0.0000000E+00 |
| A4 | −4.0069027E−06 | −2.9797401E−05 |
| A5 | −4.0116511E−06 | 5.0678274E−06 |
| A6 | 1.9322476E−06 | −1.4104856E−06 |
| A7 | −3.0556474E−07 | 2.5633878E−07 |
| A8 | 1.5084145E−08 | −2.0298979E−08 |
| A9 | 5.3417505E−10 | −2.9461048E−10 |
| A10 | −2.9150133E−11 | 9.2188992E−11 |
| A11 | −3.4316109E−12 | 3.0094687E−12 |
| A12 | 2.7309242E−14 | −3.1391599E−13 |
| A13 | 1.0843229E−14 | −2.6925527E−14 |
| A14 | 3.4115327E−16 | 3.5621021E−16 |
| A15 | −4.2858995E−17 | 1.7401064E−16 |
| A16 | 7.6873928E−19 | −6.1116557E−18 |
| A17 | 0.0000000E+00 | 0.0000000E+00 |
| A18 | 0.0000000E+00 | 0.0000000E+00 |
| A19 | 0.0000000E+00 | 0.0000000E+00 |
| A20 | 0.0000000E+00 | 0.0000000E+00 |

Table 6 shows lens data of the synthetic optical system in which the rear converter lens RCL of Example 2 is mounted on the master lens ML, Table 7 shows data on specifications, and Table 8 shows data on aspheric coefficients.

Figure 10:
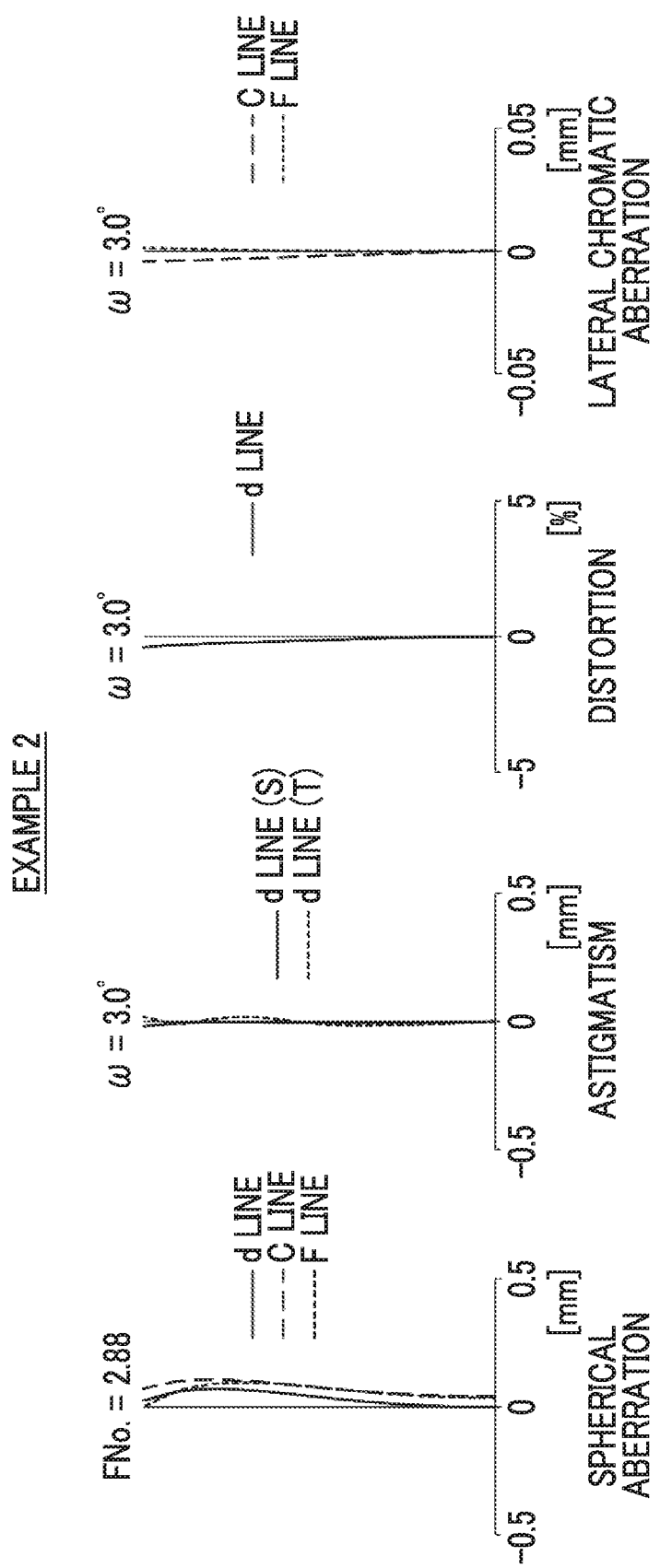
FIG. 10 is a diagram of aberrations in a state where the rear converter lens of Example 2 is mounted on the master lens.

FIG. 10 is a diagram of aberrations in a state where the rear converter lens RCL of Example 2 is mounted on the master lens ML.

TABLE 6

Example 2•Lens Data

| Si | Ri | Di | Ndj | vdj |
|---|---|---|---|---|
| 1 | 430.7013 | 7.0700 | 1.67270 | 32.10 |
| 2 | −727.3321 | 0.4562 | | |
| 3 | 165.9720 | 10.7500 | 1.43875 | 94.66 |
| 4 | −1120.2835 | 20.2132 | | |
| 5 | 105.9369 | 13.9100 | 1.49700 | 81.54 |
| 6 | −218.3400 | 3.1600 | 1.83481 | 42.74 |
| 7 | 775.7212 | 1.6106 | | |
| 8 | 91.4829 | 11.0200 | 1.49700 | 81.54 |
| 9 | −267.5300 | 2.7200 | 1.91082 | 35.25 |
| 10 | 141.8275 | 22.2150 | | |
| 11 | 266.7587 | 4.1100 | 1.80809 | 22.76 |
| 12 | −266.7587 | 0.3002 | | |
| 13 | 266.7635 | 2.0000 | 1.80000 | 29.84 |
| 14 | 47.2925 | 9.4871 | | |
| 15(St) | ∞ | 18.6296 | | |
| 16 | 61.1684 | 1.8100 | 1.54814 | 45.78 |
| 17 | 39.3800 | 6.6000 | 1.69680 | 55.53 |
| 18 | ∞ | 4.9200 | | |
| 19 | 36.1305 | 2.3000 | 1.60342 | 38.03 |
| 20 | 23.9164 | 7.9000 | | |
| 21 | 415.3848 | 2.2800 | 1.95906 | 17.47 |
| 22 | −91.4760 | 1.5100 | 1.73400 | 51.47 |
| 23 | 42.9219 | 1.8900 | | |
| 24 | −217.2372 | 1.4000 | 1.80100 | 34.97 |
| 25 | 66.6268 | 3.2077 | | |
| 26 | 51.5518 | 3.1100 | 1.90366 | 31.31 |
| 27 | ∞ | 1.0602 | | |
| 28 | −77.9583 | 1.4000 | 1.80809 | 22.76 |

TABLE 6-continued

Example 2•Lens Data

| Si | Ri | Di | Ndj | vdj |
|---|---|---|---|---|
| 29 | 145.8634 | 4.4301 | | |
| 30 | 133.6002 | 4.2800 | 1.80610 | 40.93 |
| 31 | −60.7409 | 0.6043 | | |
| 32 | 53.2520 | 8.6300 | 1.65412 | 39.68 |
| 33 | −53.2520 | 1.9000 | 1.80000 | 29.84 |
| 34 | 154.3014 | 4.2898 | | |
| 35 | 95.5773 | 0.9299 | 1.88300 | 39.22 |
| 36 | 25.0000 | 5.6823 | 1.64769 | 33.84 |
| 37 | −41.7040 | 3.4739 | | |
| 38 | −28.5997 | 0.9299 | 1.88300 | 39.22 |
| 39 | 32.6255 | 6.2250 | 1.72825 | 28.32 |
| 40 | −32.6260 | 0.9299 | 1.88300 | 39.22 |
| 41 | 90.0003 | 0.0998 | | |
| *42 | 41.4555 | 7.1414 | 1.51633 | 64.06 |
| *43 | −28.4851 | 1.0999 | | |
| 44 | −45.9600 | 1.0000 | 2.00069 | 25.46 |
| 45 | −183.9994 | 12.4693 | | |
| 46 | ∞ | 2.8500 | 1.51680 | 64.20 |
| 47 | ∞ | 0.0000 | | |

TABLE 7

| Example 2•Specification (d line) | |
|---|---|
| f | 271.53 |
| Bf | 14.35 |
| FNo. | 2.88 |
| 2ω | 6.6 |

TABLE 8

Example 2•Aspheric Coefficients

| Si | *42 | *43 |
|---|---|---|
| KA | 1.0000000E+00 | 1.0000000E+00 |
| A3 | 0.0000000E+00 | 0.0000000E+00 |
| A4 | 1.2333252E−05 | −3.1119594E−06 |
| A5 | −5.8919290E−06 | −1.8935455E−06 |
| A6 | 1.0518027E−06 | −2.3941012E−08 |
| A7 | −7.4611206E−08 | 4.6643329E−08 |
| A8 | −6.0908137E−10 | −2.7619026E−09 |
| A9 | 2.0202664E−10 | −1.9558951E−10 |
| A10 | 9.0322454E−12 | 5.4766720E−12 |
| A11 | −2.5972863E−13 | 1.1429756E−12 |
| A12 | −4.5926328E−14 | 4.7917912E−14 |
| A13 | −2.3090940E−15 | −2.1781658E−15 |
| A14 | 9.2336688E−18 | −4.2333194E−16 |
| A15 | 1.5179032E−17 | −1.9302431E−17 |
| A16 | −9.9739286E−20 | 2.1632128E−18 |
| A17 | 0.0000000E+00 | 0.0000000E+00 |
| A18 | 0.0000000E+00 | 0.0000000E+00 |
| A19 | 0.0000000E+00 | 0.0000000E+00 |
| A20 | 0.0000000E+00 | 0.0000000E+00 |

Table 9 shows lens data of the synthetic optical system in which the rear converter lens RCL of Example 3 is mounted on the master lens ML, Table 10 shows data on specifications, and Table 11 shows data on aspheric coefficients.

Figure 11:
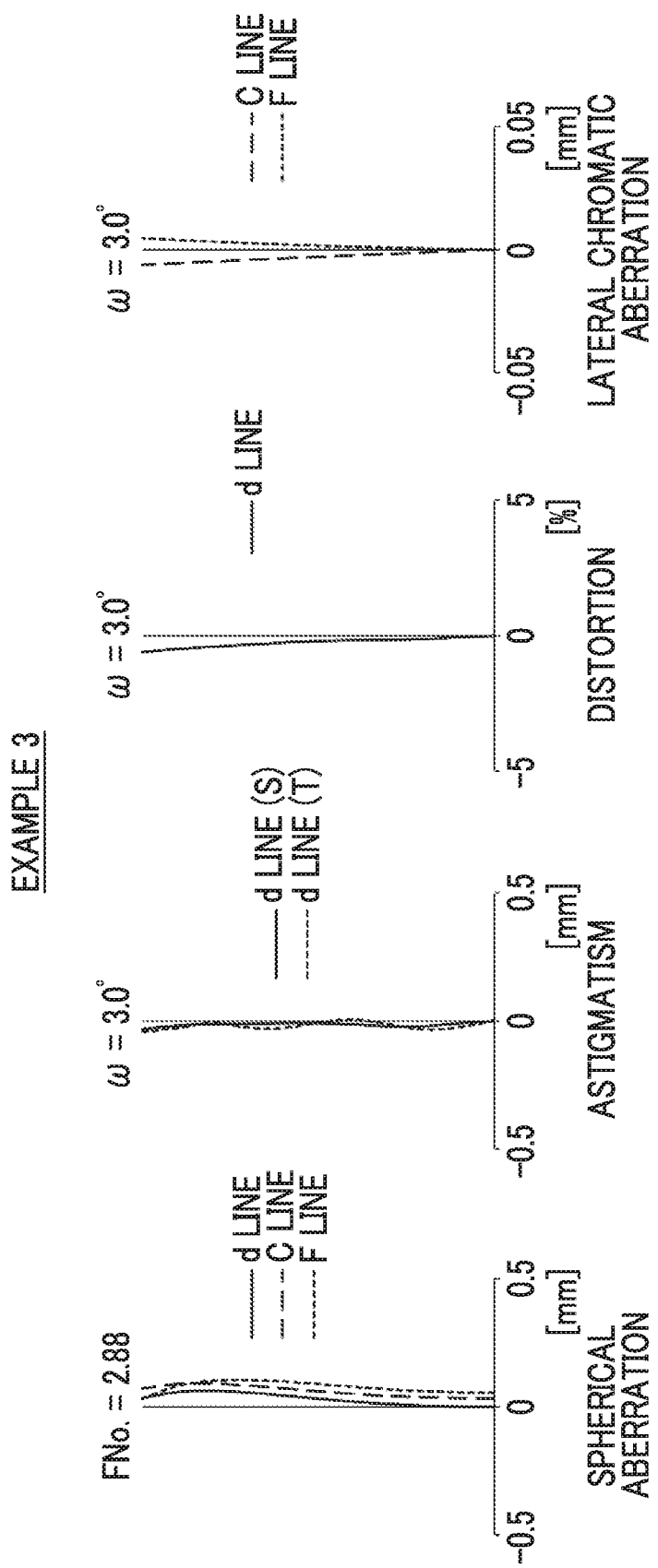
FIG. 11 is a diagram of aberrations in a state where the rear converter lens of Example 3 is mounted on the master lens.

FIG. 11 is a diagram of aberrations in a state where the rear converter lens RCL of Example 3 is mounted on the master lens ML.

TABLE 9

Example 3·Lens Data

| Si | Ri | Di | Ndj | vdj |
|---|---|---|---|---|
| 1 | 430.7013 | 7.0700 | 1.67270 | 32.10 |
| 2 | −727.3321 | 0.4562 | | |
| 3 | 165.9720 | 10.7500 | 1.43875 | 94.66 |
| 4 | −1120.2835 | 20.2132 | | |
| 5 | 105.9369 | 13.9100 | 1.49700 | 81.54 |
| 6 | −218.3400 | 3.1600 | 1.83481 | 42.74 |
| 7 | 775.7212 | 1.6106 | | |
| 8 | 91.4829 | 11.0200 | 1.49700 | 81.54 |
| 9 | −267.5300 | 2.7200 | 1.91082 | 35.25 |
| 10 | 141.8275 | 22.2150 | | |
| 11 | 266.7587 | 4.1100 | 1.80809 | 22.76 |
| 12 | −266.7587 | 0.3002 | | |
| 13 | 266.7635 | 2.0000 | 1.80000 | 29.84 |
| 14 | 47.2925 | 9.4871 | | |
| 15(St) | ∞ | 18.6296 | | |
| 16 | 61.1684 | 1.8100 | 1.54814 | 45.78 |
| 17 | 39.3800 | 6.6000 | 1.69680 | 55.53 |
| 18 | ∞ | 4.9200 | | |
| 19 | 36.1305 | 2.3000 | 1.60342 | 38.03 |
| 20 | 23.9164 | 7.9000 | | |
| 21 | 415.3848 | 2.2800 | 1.95906 | 17.47 |
| 22 | −91.4760 | 1.5100 | 1.73400 | 51.47 |
| 23 | 42.9219 | 1.8900 | | |
| 24 | −217.2372 | 1.4000 | 1.80100 | 34.97 |
| 25 | 66.6268 | 3.2077 | | |
| 26 | 51.5518 | 3.1100 | 1.90366 | 31.31 |
| 27 | ∞ | 1.0602 | | |
| 28 | −77.9583 | 1.4000 | 1.80809 | 22.76 |
| 29 | 145.8634 | 4.4301 | | |
| 30 | 133.6002 | 4.2800 | 1.80610 | 40.93 |
| 31 | −60.7409 | 0.6043 | | |
| 32 | 53.2520 | 8.6300 | 1.65412 | 39.68 |
| 33 | −53.2520 | 1.9000 | 1.80000 | 29.84 |
| 34 | 154.3014 | 4.2898 | | |
| 35 | 85.3633 | 0.9299 | 1.88300 | 39.22 |
| 36 | 25.0000 | 5.4975 | 1.67270 | 32.17 |
| 37 | −50.7899 | 3.7099 | | |
| 38 | −33.6915 | 0.9300 | 1.88300 | 39.22 |
| 39 | 36.1369 | 6.5178 | 1.59270 | 35.31 |
| 40 | −26.6455 | 0.9300 | 1.88300 | 39.22 |
| 41 | 110.0012 | 0.1999 | | |
| 42 | 54.4445 | 6.2259 | 1.58313 | 59.37 |
| *43 | −34.3981 | 0.1999 | | |
| 44 | −44.8554 | 2.0633 | 1.91082 | 35.25 |
| 45 | −85.1817 | 12.7675 | | |
| 46 | ∞ | 2.8500 | 1.51680 | 64.20 |
| 47 | ∞ | 0.0000 | | |

TABLE 10

Example 3·Specification (d line)

| | |
|---|---|
| f | 271.48 |
| Bf | 14.65 |
| FNo. | 2.88 |
| 2ω | 6.6 |

TABLE 11

Example 3·Aspheric Coefficients

| Si | *43 |
|---|---|
| KA | 1.0000000E+00 |
| A3 | 0.0000000E+00 |
| A4 | −3.8959022E−05 |
| A5 | 1.0378129E−05 |
| A6 | −1.4194112E−06 |
| A7 | 6.2080412E−08 |
| A8 | 1.8549226E−09 |
| A9 | −2.0049916E−10 |

TABLE 11-continued

Example 3·Aspheric Coefficients

| Si | *43 |
|---|---|
| A10 | 1.6342794E−11 |
| A11 | −8.6694797E−13 |
| A12 | −7.1811330E−14 |
| A13 | −4.8216586E−16 |
| A14 | 3.8289371E−16 |
| A15 | 2.8750218E−17 |
| A16 | −2.5260257E−18 |
| A17 | 1.0988381E−19 |
| A18 | 2.2652451E−21 |
| A19 | −1.2822138E−21 |
| A20 | 5.2444561E−23 |

Table 12 shows lens data of the synthetic optical system in which the rear converter lens RCL of Example 4 is mounted on the master lens ML, Table 13 shows data on specifications, and Table 14 shows data on aspheric coefficients.

Figure 12:
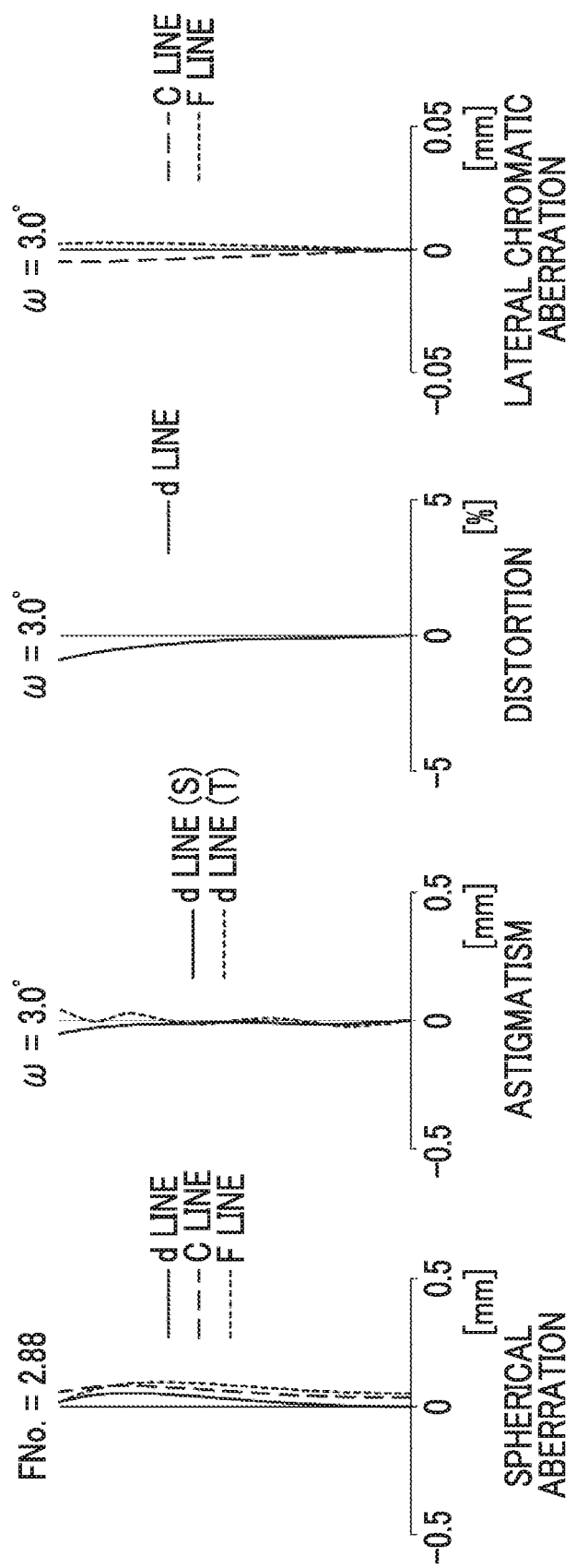
FIG. 12 is a diagram of aberrations in a state where the rear converter lens of Example 4 is mounted on the master lens.

FIG. 12 is a diagram of aberrations in a state where the rear converter lens RCL of Example 4 is mounted on the master lens ML.

TABLE 12

Example 4·Lens Data

| Si | Ri | Di | Ndj | vdj |
|---|---|---|---|---|
| 1 | 430.7013 | 7.0700 | 1.67270 | 32.10 |
| 2 | −727.3321 | 0.4562 | | |
| 3 | 165.9720 | 10.7500 | 1.43875 | 94.66 |
| 4 | −1120.2835 | 20.2132 | | |
| 5 | 105.9369 | 13.9100 | 1.49700 | 81.54 |
| 6 | −218.3400 | 3.1600 | 1.83481 | 42.74 |
| 7 | 775.7212 | 1.6106 | | |
| 8 | 91.4829 | 11.0200 | 1.49700 | 81.54 |
| 9 | −267.5300 | 2.7200 | 1.91082 | 35.25 |
| 10 | 141.8275 | 22.2150 | | |
| 11 | 266.7587 | 4.1100 | 1.80809 | 22.76 |
| 12 | −266.7587 | 0.3002 | | |
| 13 | 266.7635 | 2.0000 | 1.80000 | 29.84 |
| 14 | 47.2925 | 9.4871 | | |
| 15(St) | ∞ | 18.6296 | | |
| 16 | 61.1684 | 1.8100 | 1.54814 | 45.78 |
| 17 | 39.3800 | 6.6000 | 1.69680 | 55.53 |
| 18 | ∞ | 4.9200 | | |
| 19 | 36.1305 | 2.3000 | 1.60342 | 38.03 |
| 20 | 23.9164 | 7.9000 | | |
| 21 | 415.3848 | 2.2800 | 1.95906 | 17.47 |
| 22 | −91.4760 | 1.5100 | 1.73400 | 51.47 |
| 23 | 42.9219 | 1.8900 | | |
| 24 | −217.2372 | 1.4000 | 1.80100 | 34.97 |
| 25 | 66.6268 | 3.2077 | | |
| 26 | 51.5518 | 3.1100 | 1.90366 | 31.31 |
| 27 | ∞ | 1.0602 | | |
| 28 | −77.9583 | 1.4000 | 1.80809 | 22.76 |
| 29 | 145.8634 | 4.4301 | | |
| 30 | 133.6002 | 4.2800 | 1.80610 | 40.93 |
| 31 | −60.7409 | 0.6043 | | |
| 32 | 53.2520 | 8.6300 | 1.65412 | 39.68 |
| 33 | −53.2520 | 1.9000 | 1.80000 | 29.84 |
| 34 | 154.3014 | 4.2900 | | |
| 35 | 79.1859 | 0.9300 | 1.88300 | 39.22 |
| 36 | 25.0000 | 5.6948 | 1.67270 | 32.17 |
| 37 | −50.7899 | 3.0611 | | |
| 38 | −38.2632 | 0.9300 | 1.88300 | 39.22 |
| 39 | 23.6287 | 7.6963 | 1.59270 | 35.31 |
| 40 | −23.6284 | 0.9300 | 1.88300 | 39.22 |
| 41 | 3050.2961 | 0.2000 | | |
| 42 | 38.7914 | 5.7317 | 1.51760 | 63.50 |
| *43 | −68.6009 | 0.2000 | | |
| 44 | −1065.3275 | 1.0000 | 1.95375 | 32.32 |

TABLE 12-continued

Example 4•Lens Data

| Si | Ri | Di | Ndj | νdj |
|---|---|---|---|---|
| 45 | 100.0000 | 12.8669 | | |
| 46 | ∞ | 2.8500 | 1.51680 | 64.20 |
| 47 | ∞ | 0.0000 | | |

TABLE 13

Example 4•Specification (d line)

| | |
|---|---|
| f | 271.48 |
| Bf | 14.75 |
| FNo. | 2.88 |
| 2ω | 6.6 |

TABLE 14

Example 4•Aspheric Coefficients

| Si | *43 |
|---|---|
| KA | 1.0000000E+00 |
| A3 | 0.0000000E+00 |
| A4 | −3.5340765E−05 |
| A5 | 8.2154504E−06 |
| A6 | −1.0427966E−06 |
| A7 | 2.7433445E−08 |
| A8 | 2.7829712E−09 |
| A9 | −9.6110078E−11 |
| A10 | 1.3854354E−11 |
| A11 | −1.3487955E−12 |
| A12 | −9.0777602E−14 |
| A13 | 7.4084542E−16 |
| A14 | 6.0397489E−16 |
| A15 | 3.2593624E−17 |
| A16 | −3.0053185E−18 |
| A17 | 0.0000000E+00 |
| A18 | 0.0000000E+00 |
| A19 | 0.0000000E+00 |
| A20 | 0.0000000E+00 |

Table 15 shows lens data of the synthetic optical system in which the rear converter lens RCL of Example 5 is mounted on the master lens ML, Table 16 shows data on specifications, and Table 17 shows data on aspheric coefficients.

Figure 13:
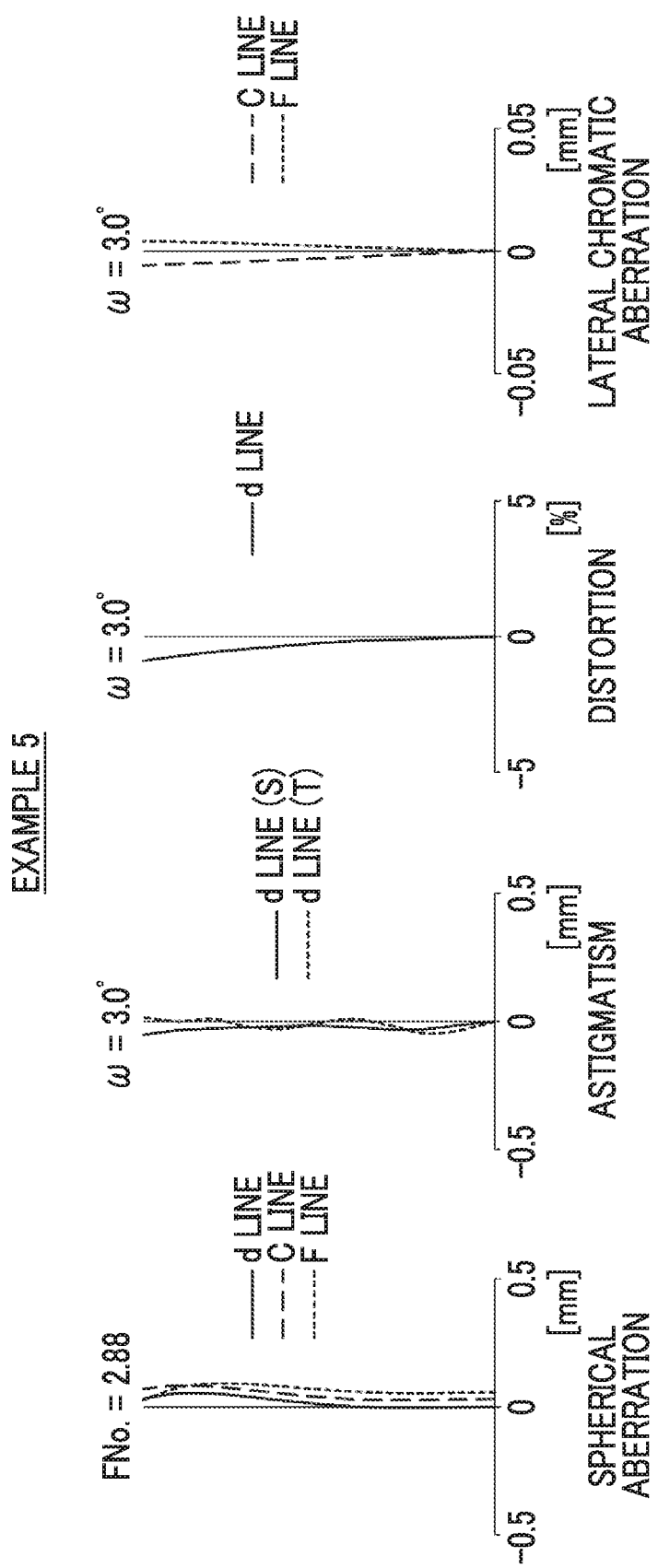
FIG. 13 is a diagram of aberrations in a state where the rear converter lens of Example 5 is mounted on the master lens.

FIG. 13 is a diagram of aberrations in a state where the rear converter lens RCL of Example 5 is mounted on the master lens ML.

TABLE 15

Example 5•Lens Data

| Si | Ri | Di | Ndj | νdj |
|---|---|---|---|---|
| 1 | 430.7013 | 7.0700 | 1.67270 | 32.10 |
| 2 | −727.3321 | 0.4562 | | |
| 3 | 165.9720 | 10.7500 | 1.43875 | 94.66 |
| 4 | −1120.2835 | 20.2132 | | |
| 5 | 105.9369 | 13.9100 | 1.49700 | 81.54 |
| 6 | −218.3400 | 3.1600 | 1.83481 | 42.74 |
| 7 | 775.7212 | 1.6106 | | |
| 8 | 91.4829 | 11.0200 | 1.49700 | 81.54 |
| 9 | −267.5300 | 2.7200 | 1.91082 | 35.25 |
| 10 | 141.8275 | 22.2150 | | |
| 11 | 266.7587 | 4.1100 | 1.80809 | 22.76 |
| 12 | −266.7587 | 0.3002 | | |
| 13 | 266.7635 | 2.0000 | 1.80000 | 29.84 |
| 14 | 47.2925 | 9.4871 | | |

TABLE 15-continued

Example 5•Lens Data

| Si | Ri | Di | Ndj | νdj |
|---|---|---|---|---|
| 15(St) | ∞ | 18.6296 | | |
| 16 | 61.1684 | 1.8100 | 1.54814 | 45.78 |
| 17 | 39.3800 | 6.6000 | 1.69680 | 55.53 |
| 18 | ∞ | 4.9200 | | |
| 19 | 36.1305 | 2.3000 | 1.60342 | 38.03 |
| 20 | 23.9164 | 7.9000 | | |
| 21 | 415.3848 | 2.2800 | 1.95906 | 17.47 |
| 22 | −91.4760 | 1.5100 | 1.73400 | 51.47 |
| 23 | 42.9219 | 1.8900 | | |
| 24 | −217.2372 | 1.4000 | 1.80100 | 34.97 |
| 25 | 66.6268 | 3.2077 | | |
| 26 | 51.5518 | 3.1100 | 1.90366 | 31.31 |
| 27 | ∞ | 1.0602 | | |
| 28 | −77.9583 | 1.4000 | 1.80809 | 22.76 |
| 29 | 145.8634 | 4.4301 | | |
| 30 | 133.6002 | 4.2800 | 1.80610 | 40.93 |
| 31 | −60.7409 | 0.6043 | | |
| 32 | 53.2520 | 8.6300 | 1.65412 | 39.68 |
| 33 | −53.2520 | 1.9000 | 1.80000 | 29.84 |
| 34 | 154.3014 | 4.2899 | | |
| 35 | 99.3276 | 0.9300 | 1.88300 | 39.22 |
| 36 | 25.0000 | 6.2811 | 1.67270 | 32.10 |
| 37 | −43.4510 | 3.4653 | | |
| 38 | −29.5315 | 0.9300 | 1.88300 | 39.22 |
| 39 | 33.2877 | 6.6620 | 1.59270 | 35.31 |
| 40 | −33.2866 | 0.9300 | 1.88300 | 39.22 |
| 41 | 204.9567 | 0.2000 | | |
| *42 | 43.3724 | 6.7275 | 1.51633 | 64.06 |
| *43 | −39.6959 | 0.2000 | | |
| 44 | −33658.8857 | 1.0000 | 1.90525 | 35.04 |
| 45 | 100.0000 | 12.8151 | | |
| 46 | ∞ | 2.8500 | 1.51680 | 64.20 |
| 47 | ∞ | 0.0000 | | |

TABLE 16

Example 5•Specification (d line)

| | |
|---|---|
| f | 271.47 |
| Bf | 14.69 |
| FNo. | 2.88 |
| 2ω | 6.2 |

TABLE 17

Example 5•Aspheric Coefficients

| Si | *42 | *43 |
|---|---|---|
| KA | 1.0000000E+00 | 1.0000000E+00 |
| A3 | 0.0000000E+00 | 0.0000000E+00 |
| A4 | 5.9161925E−05 | 2.0977908E−05 |
| A5 | −2.3068714E−05 | −8.5216364E−06 |
| A6 | 2.8135068E−06 | 2.5546949E−07 |
| A7 | −6.9970679E−08 | 6.2381017E−08 |
| A8 | −7.6524667E−09 | −9.6310210E−10 |
| A9 | 1.3791045E−10 | −4.3072196E−10 |
| A10 | 1.3435518E−11 | 1.1455466E−11 |
| A11 | 9.7022210E−13 | −2.7409124E−14 |
| A12 | 6.1635607E−15 | 1.9706263E−14 |
| A13 | −3.4220413E−15 | 2.1078544E−15 |
| A14 | −2.1127098E−16 | 8.5524653E−17 |
| A15 | 4.5807621E−18 | −4.5480433E−18 |
| A16 | 3.1396109E−19 | −5.8830243E−19 |
| A17 | 0.0000000E+00 | 0.0000000E+00 |
| A18 | 0.0000000E+00 | 0.0000000E+00 |
| A19 | 0.0000000E+00 | 0.0000000E+00 |
| A20 | 0.0000000E+00 | 0.0000000E+00 |

Table 18 shows values corresponding to Conditional Expressions (1) to (6) of the rear converter lenses RCL in Examples 1 to 5. In all the Examples, the d line is used as the reference wavelength, and the values shown in Table 18 below are the values at the reference wavelength.

TABLE 18

| Expression Number | Conditional Expression | Example 1 | Example 2 | Example 3 | Example 4 | Example 5 |
|---|---|---|---|---|---|---|
| (1) | f1/fC | −1.101 | −1.185 | −1.087 | −1.233 | −1.064 |
| (2) | f2/fC | 0.320 | 0.348 | 0.292 | 0.387 | 0.312 |
| (3) | f3/fC | −1.101 | −1.254 | −0.932 | −1.817 | −1.071 |
| (4) | ν1 − ν2 | 5.400 | 5.4 | 7.0 | 7.0 | 7.1 |
| (5) | f31/f3 | 0.614 | 0.493 | 0.656 | 0.524 | 0.652 |
| (6) | f32/f3 | −1.477 | −0.890 | −1.880 | −1.029 | −1.738 |

From the above data, it can be seen that all of the rear converter lenses RCL in Examples 1 to 5 have good optical performance.

In a case where the rear converter lens RCL is used in a harsh environment, it is preferable to apply a multilayer protective coating thereto. Furthermore, in addition to the protective coating, an anti-reflective coating may be applied to reduce ghost light during use.

Further, in the example shown in FIG. 2 and the like, an example in which a plane-parallel plate-shaped optical member PP is disposed between the lens system and the image plane Sim is shown, where the optical member PP is assumed to be a low-pass filter or various types of filters that cut a specific wavelength range. The present disclosure is not limited to thereto, and instead of disposing the various filters and the like between the lens system and the image plane Sim, the filters may be arranged between lenses. Also, for example, the lens surface of any of the lenses may be coated so as to have the same function as various filters.

Figure 14:
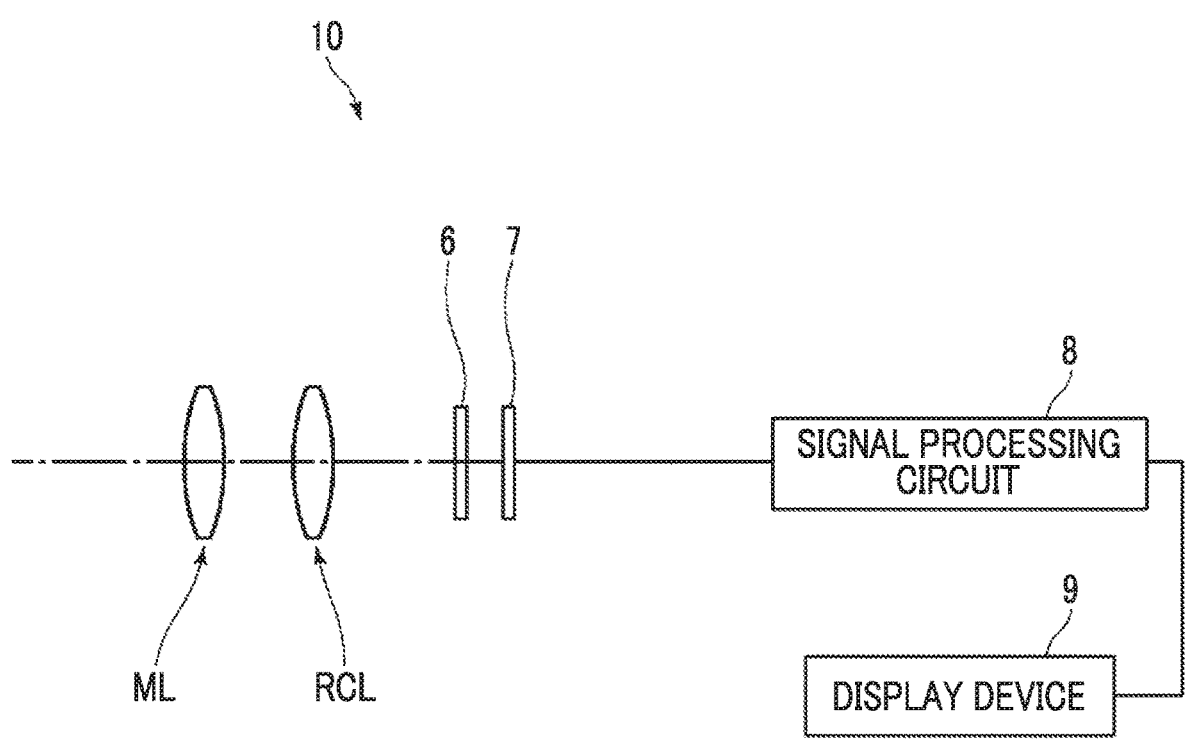
FIG. 14 is a schematic configuration diagram of an imaging apparatus according to an embodiment of the present disclosure.

Next, an imaging apparatus 10 according to an embodiment of the present disclosure will be described. FIG. 14 shows a schematic configuration diagram of the imaging apparatus 10 using the rear converter lens RCL according to the embodiment of the present disclosure. The imaging apparatus 10 is a non-reflex digital camera in which the rear converter lens RCL is attachably and detachably mounted on the image side of the master lens ML. In addition, FIG. 14 schematically shows the master lens ML and the rear converter lens RCL.

The imaging apparatus 10 shown in FIG. 14 comprises an imaging lens that is the synthetic optical system consisting of the rear converter lens RCL and the master lens ML, a filter 6 having a function such as a low-pass filter disposed on the image side of the imaging lens, the imaging element 7 disposed on the image side of the filter 6, and a signal processing circuit 8. Further, the imaging apparatus 10 also comprises a focus control section (not shown in the drawing) for performing focusing of the master lens ML.

The rear converter lens RCL is configured to be attachable and detachable to and from the master lens ML. The imaging element 7 converts an optical image formed by the imaging lens into an electric signal, and for the imaging element 7, for example, a charge coupled device (CCD) or a complementary metal oxide semiconductor (CMOS) can be used. The imaging element 7 is disposed such that the imaging surface thereof is coplanar with the image plane of the imaging lens. An image captured by the imaging lens is formed on the imaging surface of the imaging element 7, and an output signal from the imaging element 7 regarding the image is arithmetically processed by the signal processing circuit 8, and the image is displayed on a display device 9. In addition, a focusing operation is performed by the focus control section (not shown in the drawing).

According to the imaging apparatus 10 according to the embodiment of the present disclosure, an optical image, which is formed by a synthetic optical system in which the rear converter lens RCL and the master lens ML according to the embodiment of the present disclosure are combined, forms an image on the imaging element 7. The imaging element 7 outputs an imaging signal corresponding to the optical image formed by the synthetic optical system. As a result, it is possible to obtain a good captured image even under low illuminance imaging conditions, and to obtain a captured image with little spherical aberration and the like.

The present disclosure has been hitherto described through embodiments and examples, but the present disclosure is not limited to the above-mentioned embodiments and examples, and may be modified into various forms. For example, values such as the curvature radius, the surface distance, the refractive index, and the Abbe number of each lens are not limited to the values shown in the numerical examples, and different values may be used therefor.

Although the non-reflex digital camera has been described as an example of the imaging apparatus 10 on which the rear converter lens RCL of the present disclosure is mounted, the imaging apparatus is not limited thereto. For example, the rear converter lens of the present disclosure can be applied to an imaging apparatus such as a video camera, a single-lens reflex camera, a film camera, a movie picture camera, and a broadcast camera.

What is claimed is:

1. A rear converter lens having a negative refractive power and being mounted on an image side of a master lens to thereby make a focal length of a whole system including the master lens larger than a focal length of the master lens alone, the rear converter lens consisting of, in order from an object side:
 a first lens group having a positive refractive power;
 a second lens group having a negative refractive power; and
 a third lens group having a positive refractive power,
 wherein the first lens group consists of a cemented lens in which, in order from the object side, a negative lens concave toward the image side and a positive lens convex toward the object side are cemented,
 the second lens group consists of a cemented lens in which, in order from the object side, a negative lens concave toward the image side, a biconvex positive lens, and a negative lens concave toward the object side are cemented,
 the third lens group consists of, in order from the object side, a third lens group-first lens that is a positive lens convex toward the object side and a third lens group-second lens that is a negative lens, assuming that a focal length of the first lens group is f1, a focal length of the second lens group is f2, a focal length of the third lens group is f3, a focal length of the whole rear converter lens is fC, an Abbe number of the negative lens of the first lens group is ν1, and an Abbe number of the positive lens of the first lens group is ν2, Conditional Expressions (1), (2), (3) and (4) are satisfied:

$$-1.4 < f1/fC < -0.8 \tag{1}$$

$$0.2 < f2/fC < 0.5 \tag{2}$$

$$-2.5 < f3/fC < -0.7 \tag{3}$$

$$0 < \nu1 - \nu2 < 10 \tag{4}$$

assuming that a focal length of the third lens group-first lens is f31 and a focal length of the third lens group-second lens is f32, Conditional Expressions (5) and (6) are satisfied:

$$0.3 < f31/f3 < 0.8 \tag{5}$$

$$-2.5 < f32/f3 < -0.6 \tag{6},\text{ and}$$

at least one of lens surfaces of the third lens group-first lens is aspherical.

2. The rear converter lens according to claim 1, wherein Conditional Expression (1-1) is further satisfied:

$$-1.3 < f1/fC < -0.9 \tag{1-1}$$

3. The rear converter lens according to claim 1, wherein Conditional Expression (2-1) is further satisfied:

$$0.25 < f2/fC < 0.4 \tag{2-1}$$

4. The rear converter lens according to claim 1, wherein Conditional Expression (3-1) is satisfied:

$$-2.2 < f3/fC < -0.8 \tag{3-1}$$

5. The rear converter lens according to claim 1, wherein Conditional Expression (4-1) is further satisfied:

$$3 < \nu1 - \nu2 < 8 \tag{4-1}$$

6. The rear converter lens according to claim 1, wherein Conditional Expression (5-1) is further satisfied:

$$0.4 < f31/f3 < 0.7 \tag{5-1}$$

7. The rear converter lens according to claim 1, wherein Conditional Expression (6-1) is further satisfied:

$$-2.2 < f32/f3 < -0.7 \tag{6-1}$$

8. An imaging apparatus comprising the rear converter lens according to claim 1.

* * * * *